US010073224B2

(12) United States Patent
Tong et al.

(10) Patent No.: US 10,073,224 B2
(45) Date of Patent: Sep. 11, 2018

(54) OPTICAL FIBER CONNECTOR AND METHOD OF ASSEMBLING THE SAME ON SITE

(71) Applicant: ADC Telecommunications (Shanghai) Distribution Co., Ltd., Shanghai (CN)

(72) Inventors: Zhaoyang Tong, Shanghai (CN); Xingjun Cheng, Shanghai (CN); Lei Liu, Shanghai (CN); Longzhou Qi, Shanghai (CN)

(73) Assignee: ADC TELECOMMUNICATIONS (SHANGHAI) DISTRIBUTION CO. LTD, Shanghai (CN)

( * ) Notice: Subject to any disclaimer, the term of this patent is extended or adjusted under 35 U.S.C. 154(b) by 0 days.

(21) Appl. No.: 15/324,971

(22) PCT Filed: Jul. 6, 2015

(86) PCT No.: PCT/IB2015/055096
§ 371 (c)(1),
(2) Date: Jan. 9, 2017

(87) PCT Pub. No.: WO2016/005879
PCT Pub. Date: Jan. 14, 2016

(65) Prior Publication Data
US 2017/0212312 A1    Jul. 27, 2017

(30) Foreign Application Priority Data

Jul. 9, 2014 (CN) .......................... 2014 1 0324522

(51) Int. Cl.
*G02B 6/36* (2006.01)
*G02B 6/38* (2006.01)

(52) U.S. Cl.
CPC ......... *G02B 6/3885* (2013.01); *G02B 6/3821* (2013.01); *G02B 6/3849* (2013.01); *G02B 6/3882* (2013.01)

(58) Field of Classification Search
None
See application file for complete search history.

(56) References Cited

U.S. PATENT DOCUMENTS 6,398,422 B1    6/2002 Szilagyi et al.
7,204,016 B2    4/2007 Roth et al.
(Continued)

FOREIGN PATENT DOCUMENTS

CN    1333471 A    1/2002
CN    101346653 A    1/2009
(Continued)

OTHER PUBLICATIONS

International Search Report for International Patent Application No. PCT/IB2015/055096 dated Oct. 21, 2015, 2 pg.
(Continued)

*Primary Examiner* — Mike Stahl
(74) *Attorney, Agent, or Firm* — Merchant & Gould P.C.

(57) ABSTRACT

The present disclosure provides an optical fiber connector, comprising an integrated ferrule assembly and an integrated outer housing assembly, the ferrule assembly being adapted to be fitted into the housing assembly. The ferrule assembly at least comprises an inner housing, a spring, a multi-hole ferrule, a multi-fiber optical cable, a sleeve and a thermal shrinkable tube. The housing assembly at least comprises an outer housing, an outer tail tube and an outer protection cap. In the present disclosure, a plurality of components such as the inner housing, the spring, the multi-hole ferrule, multi-fiber optical cable, the sleeve, the thermal shrinkable tube and the like can be preassembled into an integrated ferrule
(Continued)

assembly, and a plurality of components such as the outer housing, the outer tail tube, the outer protection cap and the like can be preassembled into an integrated outer housing assembly; then, a worker only needs to insert the integrated ferrule assembly into the integrated outer housing assembly on site, thereby completing assembling operation of the whole optical fiber connector conveniently and quickly.

21 Claims, 19 Drawing Sheets

(56) References Cited

U.S. PATENT DOCUMENTS

| | | | |
|---|---|---|---|
| 7,344,317 B2 | 3/2008 | Krowiak et al. | |
| 7,614,799 B2 | 11/2009 | Bradley et al. | |
| 8,311,378 B2 | 11/2012 | Niiyama et al. | |
| 2004/0223699 A1* | 11/2004 | Melton | G02B 6/3869 385/53 |
| 2007/0025665 A1 | 2/2007 | Dean, Jr. et al. | |
| 2010/0202748 A1 | 8/2010 | Pierce et al. | |
| 2014/0086534 A1 | 3/2014 | Lu et al. | |

FOREIGN PATENT DOCUMENTS

| | | |
|---|---|---|
| CN | 101641627 A | 2/2010 |
| CN | 201527493 U | 7/2010 |
| CN | 102313934 A | 1/2012 |
| CN | 202583527 U | 12/2012 |
| CN | 202815276 U | 3/2013 |
| CN | 202956505 U | 5/2013 |
| CN | 103353635 A | 10/2013 |
| CN | 203786340 U | 8/2014 |
| CN | 203825243 U | 9/2014 |
| EP | 2 355 286 A1 | 8/2011 |
| WO | 2013/077969 A1 | 5/2013 |

OTHER PUBLICATIONS

Chinese Office Action for Chinese Patent Application No. 201410324522.7 dated Nov. 4, 2016, 12 pgs.

* cited by examiner

OPTICAL FIBER CONNECTOR AND METHOD OF ASSEMBLING THE SAME ON SITE

CROSS-REFERENCE TO RELATED APPLICATION

This application is a National Stage of PCT/IB2015/055096, filed Jul. 6, 2015, which claims the benefit of Chinese Patent Application No. 201410324522.7 filed on Jul. 9, 2014 in the State Intellectual Property Office of China the disclosures of which are incorporated herein by reference in their entireties. To the extent appropriate a claim of priority is made to each of the above disclosed applications.

BACKGROUND OF THE INVENTION

Field of the Invention

The present disclosure relates to an optical fiber connector and a method of assembling the same on site.

Description of the Related Art

In prior arts, a design of a multi-hole ferrule based enhancement mode multi-core optical fiber connector is accomplished by machining and assembling all elements in a controllable factory environment. When such a design is to be applied in an application environment with a limited space (for example, an assembly needs to be passed through a pipe with a limited space), it is very difficult for the connector to be applied in the environment with a limited space due to a relative larger head of the whole connector, and even an effective routing of the optical cable assembly cannot be achieved.

In prior arts, the enhancement mode multi-core optical fiber connector is generally designed and manufactured as follows (a connector comprising a male ferrule is taken as an example, the same is true for a connector comprising a female ferrule):

In a factory environment, a polished multi-hole ferrule (containing preassembled optical fibers therein), an optical fiber protection sleeve, an alignment pin (wherein a male ferrule comprises an alignment pin, and a female ferrule comprises an alignment hole mating with the alignment pin) and a spring are fixed on an inner housing through a spring tail-holder, an optical cable strengthening component is fixed on the inner housing by using an inner housing cover sheet and a sleeve so that the optical cable and the inner housing are formed into a whole, then an outer housing is fitted over the inner housing, and a thermal shrinkable tube, a tail sleeve, an alignment insert, an outer protection housing and a seal ring are assembled, thereby forming a complete enhancement mode multi-core optical fiber connector.

The enhancement mode multi-core optical fiber connector in prior arts has the following defects:

a) it is not easy to pass the connector through a pipe on site due to its large dimension, particularly when the pipe has a limited space, which makes a routing operation of the optical cable difficult, or even impossible;

b) if a method of splicing a tail fiber for the enhancement mode multi-core optical fiber connector is used, that is, only the optical cable is passed through the pipe on site, and then a tail fiber prefabricated in the factory environment for the enhancement mode multi-core optical fiber connector is spliced to the optical cable outside the pipe. Although connection of the optical cable can be achieved by using this method, it is hard to ensure the splicing connection has an uniform optical quality, this is because during splicing, the multi-core optical fiber has a relatively complicated structure and there are a number of uncertainties (e.g., dust or the like) in a field (mostly, outdoor) environment. Moreover, a technician/engineer who carries out the splicing operation should have a high level operant skill, the operation is time-consuming and thereby the cost in assembling is high. What is more important is that the uncertainty of the operation leads to a risk of reducing reliability of the connector;

c) no protection cap is mounted on the ferrule, thus, a front end surface of the ferrule and a front end surface of the optical fibers in an internal bore of the ferrule can be damaged easily; and d) all components composing the optical fiber connector need to be assembled one by one on site, the assembling is time-consuming, and therefore it is inconvenient for a quick installation.

SUMMARY OF THE INVENTION

The present invention is aimed to overcome or alleviate at least one aspect of the above mentioned problems and disadvantages.

An object of the present disclosure is to provide an optical fiber connector, which can be quickly assembled on site.

According to one aspect of the present disclosure, there is provided an optical fiber connector, comprising:

an integrated ferrule assembly composed of at least:
an inner housing;
a spring mounted in the inner housing;
a multi-hole ferrule mounted on a front end of the inner housing and compressing the spring;
a multi-fiber optical cable with an end thereof inserted into the inner housing from a rear end of the inner housing, a plurality of optical fibers at the end being fixed in a plurality of through holes of the ferrule;
a sleeve mounted on the rear end of the inner housing and cooperating with the inner housing to fix a strengthening element which is located at one end of the cable on the rear end of the inner housing; and
a thermal shrinkable tube thermally shrunk over the sleeve and a section of the cable exposed from the sleeve; and an integrated outer housing assembly composed of at least:
an outer housing;
an outer tail tube connected to a rear end of the outer housing; and
an outer protection cap hermetically connected to a front end of the outer housing, wherein the integrated ferrule assembly is adapted to be fitted in the integrated outer housing assembly.

According to one exemplary embodiment of the present disclosure, the optical fiber connector is a female connector; and the housing assembly further comprises a seal ring, the outer protection cap is threaded onto an outer wall of the front end of the outer housing, and the seal ring is pressed between the outer protection cap and the outer housing, thereby sealing an interface between the outer protection cap and the outer housing.

According to a further exemplary embodiment of the present disclosure, the optical fiber connector is a male connector, and the housing assembly further comprises a screw nut fitted over the outer housing and threaded with the outer protection cap, and a seal ring pressed between the outer protection cap and the outer housing, thereby sealing an interface between the outer protection cap and the outer housing.

According to a further exemplary embodiment of the present disclosure, an annular seal ring is fitted over the sleeve so that when the outer housing of the optical fiber connector is fitted on the ferrule assembly, the annular seal ring is pressed by the outer housing of the optical fiber connector, thereby sealing an interface between the outer housing of the optical fiber connector and the ferrule assembly.

According to a further exemplary embodiment of the present disclosure, an annular positioning recess is formed in the sleeve, and the annular seal ring is arranged in the positioning recess.

According to a further exemplary embodiment of the present disclosure, the ferrule assembly further comprises an inner tail sleeve fixed on the rear end of the inner housing, thermal shrinkable tube is thermally shrunk over the inner tail sleeve, and cooperates with the inner tail sleeve to form a lateral pulling prevention device for preventing the optical cable being affected by a lateral pulling force.

According to a further exemplary embodiment of the present disclosure, the ferrule assembly further comprises an optical fiber protection sleeve which is embedded in a mounting groove at a rear end of the multi-hole ferrule, and through which the plurality of optical fibers pass.

According to a further exemplary embodiment of the present disclosure, the multi-hole ferrule is a male ferrule, and the ferrule assembly further comprises an alignment pin mating with an alignment hole in a female ferrule, the alignment pin being fitting in a mounting hole of the multi-hole ferrule and projected from a front end of the multi-hole ferrule.

According to a further exemplary embodiment of the present disclosure, the multi-hole ferrule is a female ferrule, in which an alignment hole is formed to mate with an alignment pin of a male ferrule.

According to a further exemplary embodiment of the present disclosure, the inner housing comprises a first half-housing and a second half-housing which are separated from each other and are capable of being assembled together.

According to a further exemplary embodiment of the present disclosure, the first half-housing and the second half-housing are assembled together through a first snapping mechanism.

According to a further exemplary embodiment of the present disclosure, the first snapping mechanism comprises: a first elastic snapping buckle formed on one of the first half-housing and the second half-housing; and a first snapping recess formed in the other one of the first half-housing and the second half-housing.

According to a further exemplary embodiment of the present disclosure, two first positioning features, which cooperate with each other for preventing the first half-housing and the second half-housing from being assembled together in a misalignment state, are formed on the first half-housing and the second half-housing, respectively.

According to a further exemplary embodiment of the present disclosure, the first positioning features comprise: a first positioning protrusion formed on one of the first half-housing and the second half-housing; and a first positioning recess formed on the other one of the first half-housing and the second half-housing.

According to a further exemplary embodiment of the present disclosure, the inner housing and the outer housing are assembled together through a second snapping mechanism.

According to a further exemplary embodiment of the present disclosure, the second snapping mechanism comprises: a second elastic snapping buckle formed on one of an outer wall of the inner housing and an inner wall of the outer housing; and a second snapping recess formed in the other one of the outer wall of the inner housing and the inner wall of the outer housing.

According to a further exemplary embodiment of the present disclosure, two second positioning features, which cooperate with each other for preventing the inner housing and the outer housing from being assembled together in a misalignment state, are formed on the outer wall of the inner housing and the inner wall of the outer housing, respectively.

According to a further exemplary embodiment of the present disclosure, the second positioning features comprise: a second positioning protrusion formed on one of the outer wall of the inner housing and the inner wall of the outer housing; and a second positioning recess formed in the other one of the outer wall of the inner housing and the inner wall of the outer housing.

According to a further exemplary embodiment of the present disclosure, the optical fiber connector is a female connector or a male connector, and the second positioning feature of the female connector mismatches with the second positioning feature of the male connector so as to prevent the outer housing of the male connector from being mounted on the inner housing of the female connector in error, or to prevent the outer housing of the female connector from being mounted on inner housing of the male connector in error.

According to a further exemplary embodiment of the present disclosure, the ferrule assembly further comprises a ferrule protection cap, which is fitted over a front end surface of the ferrule so as to cover front end surfaces of the optical fibers in an internal bore of the ferrule and at least a part of a mating region of a front end surface of the ferrule mating with a mating ferrule, so that the front end surfaces of the optical fibers and the at least a part of the mating region of the front end surface of the ferrule are isolated from external environment.

According to a further exemplary embodiment of the present disclosure, the ferrule protection cap comprises: a body portion including a mating end surface mating with the front end surface of the ferrule; and an elastic tail portion connected to a side of the body portion facing to the mating end surface and extending by a predetermined length in a direction of axis of the optical fibers.

According to a further exemplary embodiment of the present disclosure, a receiving recess is formed in the mating end surface of the ferrule protection cap, and the front end surfaces of the optical fibers are hermetically received within the receiving recess when the ferrule protection cap is fitted over the front end surface of the ferrule.

According to a further exemplary embodiment of the present disclosure, the front end surface of the ferrule is formed at a predetermined angle with respect to axes of the optical fibers, and the mating end surface of the ferrule protection cap is formed at an angle complementary to that of the front end surface of the ferrule.

According to a further exemplary embodiment of the present disclosure, when the ferrule is a male ferrule, the mating end surface of the ferrule protection cap is formed therein with an assembling hole for mating with the alignment pin of the male ferrule; and when the ferrule is a female ferrule, the mating end surface of the protection cap is formed thereon with an assembling pin for mating with the alignment hole of the female ferrule.

According to a further exemplary embodiment of the present disclosure, a receiving hole for mating with the ferrule is formed in the outer housing of the optical fiber connector; and the ferrule protection cap is configured to be capable of passing through the receiving hole of the optical fiber connector.

According to a further exemplary embodiment of the present disclosure, a dimension of the ferrule protection cap in a direction perpendicular to the axes of the optical fibers is smaller than that of the ferrule in the direction perpendicular to the axes of the optical fibers.

According to a further exemplary embodiment of the present disclosure, when the outer housing of the optical fiber connector is fitted on the ferrule assembly, the elastic tail portion of the ferrule protection cap extends out from the outer housing so as to facilitate removal of the ferrule protection cap after the outer housing is fitted on ferrule assembly.

According to a further exemplary embodiment of the present disclosure, the elastic tail portion of the ferrule protection cap is a corrugated elastic component, an elastic component in the form of a spring or an elastic component in the form of an elastic sheet.

According to another aspect of the present disclosure, there is provided a method of assembling an optical fiber connector on site, comprising steps of:

providing the ferrule assembly as defined in any of preceding embodiments;

providing a traction component and hermetically connecting the traction component to the ferrule assembly so as to seal the ferrule of the ferrule assembly within the traction component;

passing the ferrule assembly through an elongated pipe by towing the traction component;

removing the traction component from the ferrule assembly;

providing the housing assembly defined in any one of preceding embodiments; and fitting the ferrule assembly into the housing assembly, thereby forming an integrated optical fiber connector.

According to one exemplary embodiment of the present disclosure, the ferrule assembly comprises a ferrule protection cap fitting over a front end surface of the ferrule; and when the traction component is hermetically connected to the ferrule assembly, the traction component holds the ferrule protection cap of the ferrule assembly on the ferrule so as to prevent the ferrule protection cap from being disengaged from the ferrule when the ferrule assembly is towed through the pipe.

According to a further exemplary embodiment of the present disclosure, the traction component is threaded on the inner housing of the ferrule assembly; and when the traction component is threaded on the inner housing of the ferrule assembly, an annular seal ring on the sleeve of the ferrule assembly is pressed by the traction component so as to seal an interface between the traction component and the ferrule assembly.

According to a further exemplary embodiment of the present disclosure, the traction component is a cylindrical component having a closed end and an open end, the cylindrical component fitting over the inner housing of the ferrule assembly.

According to a further exemplary embodiment of the present disclosure, an external thread is formed on an outer wall of the inner housing of the ferrule assembly, and an internal thread is formed on an inner wall of the traction component and configured to be connected with the external thread.

According to a further exemplary embodiment of the present disclosure, a connection portion is formed on an outer side of the closed end of the traction component and connected with a traction rod or a traction cord, so that the traction assembly is driven through the pipe by pulling or pushing the traction rod or traction cord.

According to a further exemplary embodiment of the present disclosure, an inner wall of the traction component is pressed on an elastic tail portion of the ferrule protection cap, so that the ferrule protection cap is elastically held on the ferrule.

According to a further exemplary embodiment of the present disclosure, an outer diameter of the traction component is substantially the same as that of the thermal shrinkable tube.

In embodiments of the present disclosure, a plurality of components, such as the inner housing, the spring, the multi-hole ferrule, the multi-fiber optical cable, the sleeve, the thermal shrinkable tube and the like, can be preassembled into an integrated ferrule assembly, and a plurality of components, such as the outer housing, the outer tail tube, the outer protection cap and the like, can be preassembled into an integrated outer housing assembly; then, a worker only needs to insert the integrated ferrule assembly into the integrated outer housing assembly on site, thereby the assembling operation of the whole optical fiber connector can be completed conveniently and quickly.

Further, the integrated ferrule assembly, which has a smaller volume, can easily be passed through an elongated pipe, and after being passed through the pipe, the integrated ferrule assembly can be conveniently fitted into the integrated outer housing assembly, so as to form a complete multi-core optical fiber connector.

Furthermore, in embodiments of the present disclosure, when the ferrule assembly fitted with the ferrule protection cap is passed through the elongated pipe or is fitted into the integrated outer housing assembly, the front end surface of the ferrule and the front end surfaces of the optical fibers can be effectively protected from being damaged from outside.

BRIEF DESCRIPTION OF THE DRAWINGS

The above and other features and advantages of the present invention will become more apparent by describing in detail exemplary embodiments thereof with reference to the accompanying drawings, in which:

FIG. 17b is an assembly diagram showing the female connector formed by assembling the ferrule assembly and housing assembly shown in FIG. 17a;

FIG. 19b is an assembly diagram showing the male connector formed by assembling the ferrule assembly and housing assembly shown in FIG. 19a.

DETAILED DESCRIPTION OF PREFERRED EMBODIMENTS OF THE INVENTION

Figure 1:
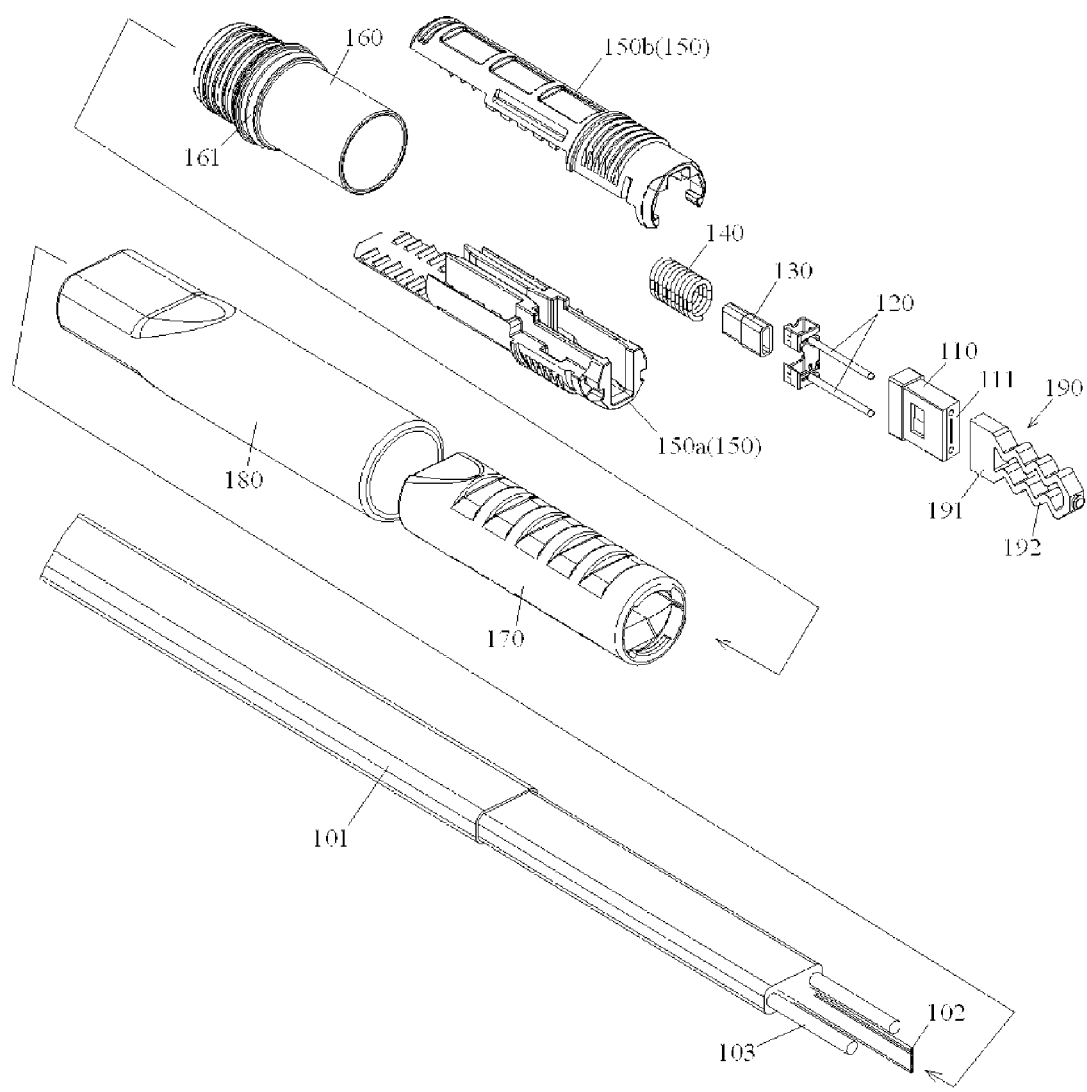
FIG. 1 is a schematic exploded view showing a ferrule assembly according to one exemplary embodiment of the present disclosure.

Exemplary embodiments of the present invention will be described hereinafter in detail with reference to the attached drawings, wherein the like reference numbers refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one general inventive concept of the present invention, there is provided a ferrule protection cap 190 for an optical fiber ferrule, the ferrule protection cap comprising: a body portion 191 comprising a first side and a second side opposite to each other in a first direction, the first side of the body portion 191 being mounted on a front end of a ferrule 110; and an elastic tail portion 192 connected to the second side of the body portion 191 and extending by a predetermined length in the first direction.

Figure 2:
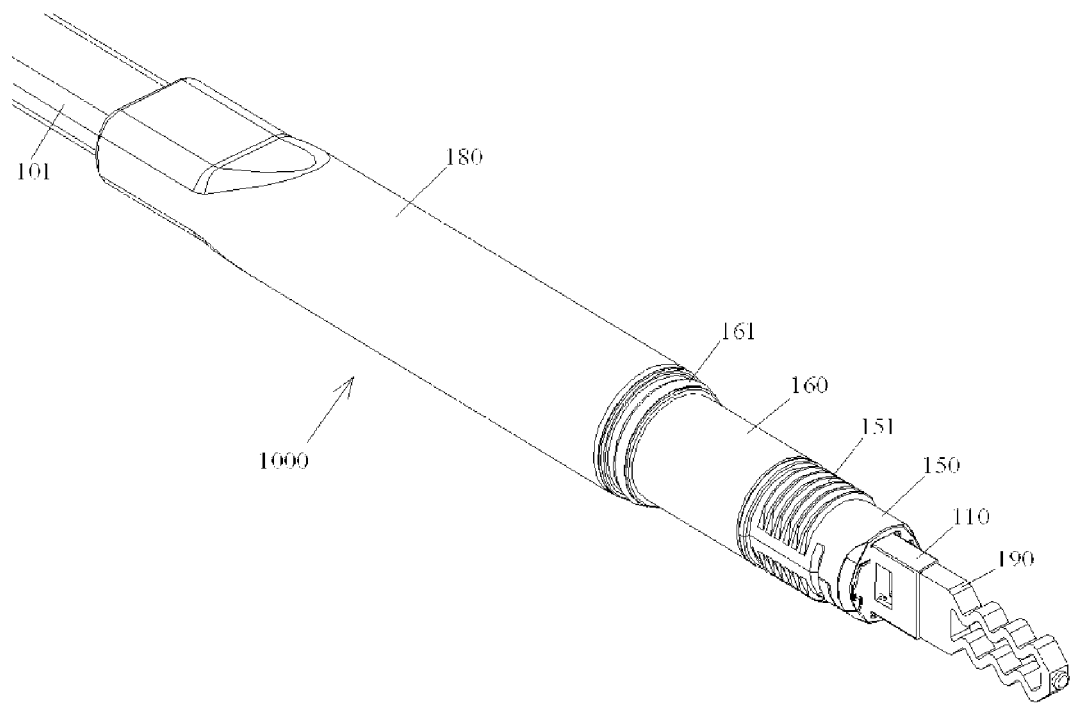
FIG. 2 is an assembly diagram showing a ferrule assembly according to one exemplary embodiment of the present disclosure.
Figure 14:
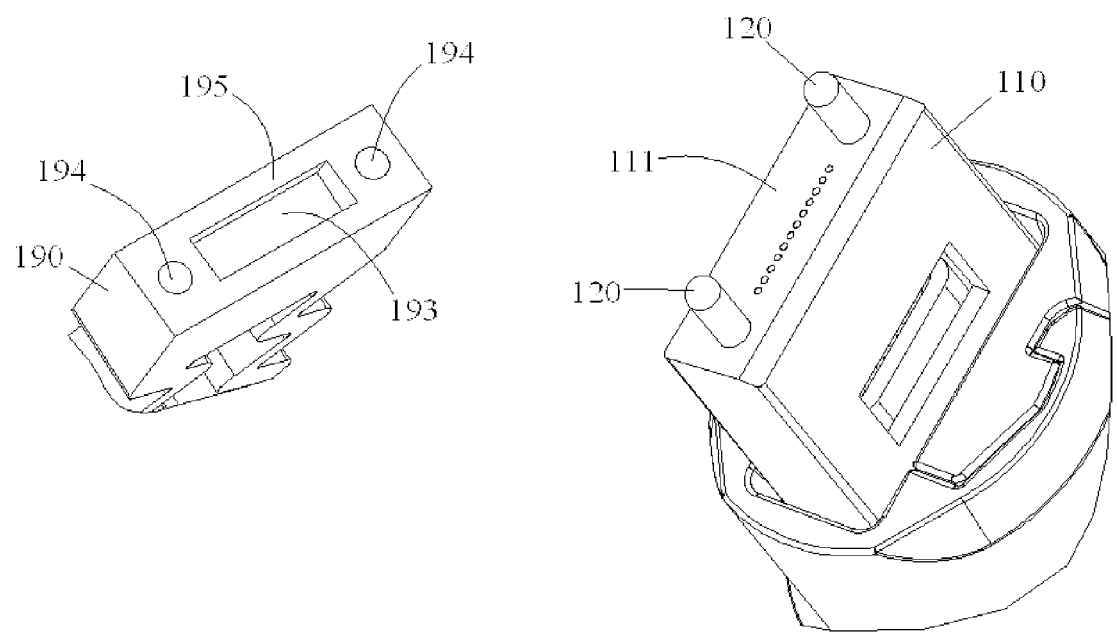
FIG. 14 is a schematic enlarged view showing the ferrule protection cap and the multi-hole ferrule shown in FIG. 1.
Figure 15:
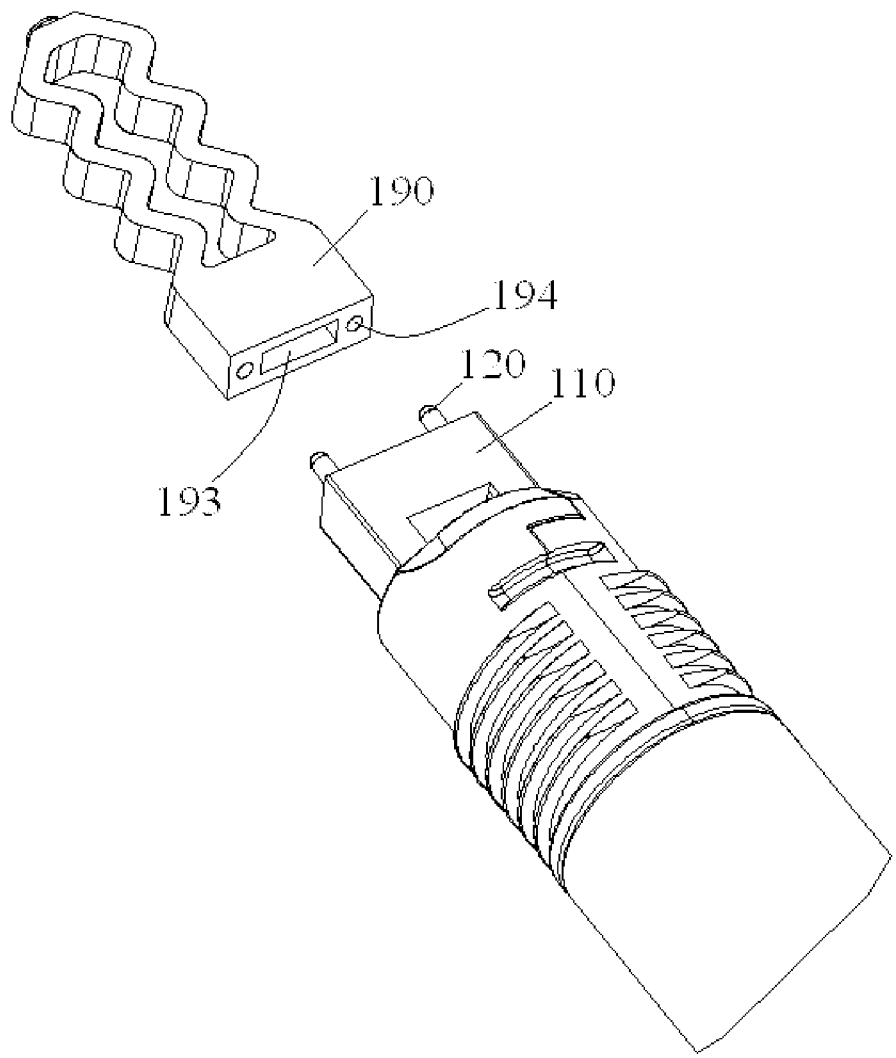
FIG. 15 is a schematic diagram showing an operation of assembling the ferrule protection cap and the multi-hole ferrule shown in FIG. 1.

FIG. 1 is a schematic exploded view showing a ferrule assembly according to one exemplary embodiment of the present disclosure; FIG. 2 is an assembly diagram showing a ferrule assembly according to one exemplary embodiment of the present disclosure; FIG. 14 is a schematic enlarged view showing the ferrule protection cap and the multi-hole ferrule shown in FIG. 1; and FIG. 15 is a schematic diagram showing an operation of assembling the ferrule protection cap and the multi-hole ferrule shown in FIG. 1

As shown in FIGS. 1-2 and FIGS. 14-15, in the illustrated embodiment, the ferrule 110 is a multi-hole ferrule, and the ferrule protection cap 190 is configured to be fitted over the multi-hole ferrule. However, the present disclosure is not limited to the illustrated embodiments, the ferrule protection cap may be modified so as to be fitted over a single-hole ferrule; for example, the body portion 191 of the illustrated ferrule protection cap 190 can be modified into a sleeve; as such, the body portion 191 in the form of a sleeve may be directly fitted over a front end of the single-hole ferrule.

As shown in FIGS. 1-2 and FIGS. 14-15, the ferrule protection cap 190 mainly comprises the body portion 191 and the elastic tail portion 192. The body portion 191 comprises the first side and the second side opposite to each other in the first direction (when the ferrule protection cap 190 is fitted over the ferrule 110, the first direction is parallel to a direction of an axis of an optical fiber), the first side of the body portion 191 is mounted on the front end of the ferrule 110. The elastic tail portion 192 is connected to the second side of the body portion 191 and extends by the predetermined length in the first direction.

As shown in FIGS. 1-2 and FIGS. 14-15, the body portion 191 covers front end surfaces of the optical fibers 102 in an internal bore of the ferrule 110 and at least a part of a mating region of a front end surface 111 of the ferrule 110 mating with a mating ferrule, so that the front end surface of the optical fibers 102 and the at least a part of the mating region of the front end surface 111 of the ferrule 110 are isolated from external environment.

As shown in FIGS. 1-2 and FIGS. 14-15, the body portion 191 and the ferrule 110 are assembled together through a shaft-hole fitting.

As shown in FIGS. 1-2 and FIGS. 14-15, the body portion 191 comprises a mating end surface 195 mating with the front end surface 111 of the ferrule 110; the mating end surface 195 of the body portion 191 is provided with an assembling hole/pin to mate with an alignment pin/hole of the front end surface 111 of the ferrule 110, and the body portion 191 and the ferrule 110 are assembled together by mating the alignment pin/hole with the assembling hole/pin.

As shown in FIGS. 1-2 and FIGS. 14-15, a receiving recess 193 is formed in the mating end surface 195 of the ferrule protection cap, so that when the ferrule protection cap 190 is fitted over the front end surface 111 of the ferrule 110, the front end surfaces of the optical fibers 102 in the internal bore of the ferrule 110 are hermetically received within the receiving recess 193.

As shown in FIGS. 1-2 and FIGS. 14-15, the front end surface 111 of the ferrule 110 is formed at a predetermined angle to axes of the optical fibers, and the mating end surface 195 of the ferrule protection cap 190 is formed at an angle complementary to an angle of the front end surface 111 of the ferrule 110.

As shown in FIGS. 1-2 and FIGS. 14-15, the elastic tail portion 192 of the ferrule protection cap 190 may be a corrugated elastic component, an elastic component in the form of a spring, or an elastic component in the form of an elastic sheet.

As shown in FIGS. 1-2 and FIGS. 14-15, when the ferrule protection cap 190 is fitted over the ferrule 110, the ferrule protection cap 190 can be passed through a receiving hole 390 in an outer housing 300 of the connector for receiving the ferrule 110.

According to another general inventive concept of the present invention, there is provided a ferrule assembly 1000, comprising: an inner housing 150; a spring 140 mounted in the inner housing 150; a multi-hole ferrule 110 mounted on a front end of the inner housing 150 and compressing the spring 140; a multi-fiber optical cable 101 with an end thereof inserted into the inner housing 150 from a rear end of the inner housing 150, a plurality of optical fibers 102 at this end being fixed in a plurality of through holes of the ferrule 110; a sleeve 160 mounted on the rear end of the inner housing 150 and cooperating with the inner housing 150 to fix a strengthening element 103 which is located at one end of the cable 101 on the rear end of the inner housing 150; and a thermal shrinkable tube 180 thermally shrunk over the sleeve 160 and a section of the cable 101 exposed from the sleeve 160. The ferrule assembly 1000 is an independent integral component separated from the outer housing 300 of the optical fiber connector, and the outer housing 300 of the optical fiber connector can be fitted over the ferrule assembly 1000.

FIG. 1 is a schematic exploded view showing a ferrule assembly according to one exemplary embodiment of the present disclosure. FIG. 2 is an assembly diagram showing a ferrule assembly according to one exemplary embodiment of the present disclosure.

As shown in FIG. 1 and FIG. 2, the illustrated ferrule assembly 1000 are assembled by a plurality of separate components, except for the outer housing 300 and an outer tail tube 400 (see FIG. 8), and the ferrule assembly 1000 comprises: an inner housing 150; a spring 140 mounted in the inner housing 150; a multi-hole ferrule 110 mounted on a front end of the inner housing 150 and compressing the spring 140; a multi-fiber optical cable 101 with an end thereof inserted into the inner housing 150 from a rear end of the inner housing 150, a plurality of optical fibers 102 at this end being fixed in a plurality of through holes of the ferrule 110; a sleeve 160 mounted on the rear end of the inner housing 150 and cooperating with the inner housing 150 to fix a strengthening element 103 which is located at one end of the cable 101 on the rear end of the inner housing 150; a thermal shrinkable tube 180 thermally shrunk over the sleeve 160 and a section of the cable 101 exposed from the sleeve 160; an inner tail sleeve 170 fixed on the rear end of the inner housing 150, the thermal shrinkable tube 180 being thermally shrunk over the inner tail sleeve 170 and cooperating with the inner tail sleeve 170 to form a lateral pulling prevention device for preventing the optical cable being affected by a lateral pulling force; an optical fiber protection sleeve 130, which is embedded in a mounting groove (not shown) at a rear end of the multi-hole ferrule 110, and through which the plurality of optical fibers 102 pass; and a ferrule protection cap 190 fitted over a front end surface 111 of the ferrule 110 so as to cover front end surfaces of the optical fibers 102 in an internal bore of the ferrule 110 and at least a part of a mating region of the front end surface 111 of the ferrule 110 mating with a mating ferrule (not shown), so that the front end surfaces of the optical fibers 102 and the at least a part of the mating region of the front end surface 111 of the ferrule 110 are isolated from external environment.

The ferrule assembly 1000 shown in FIG. 1 and FIG. 2 is an independent assembly separated from the outer housing 300 (see FIG. 8) of the optical fiber connector; and the outer housing 300 of the optical fiber connector and the outer tail tube 400 can be fitted over the ferrule assembly 1000 shown in FIG. 2.

Continued with reference to FIG. 1 and FIG. 2, an annular seal ring 161 is fitted over the sleeve 160. Specifically, an annular positioning recess is formed in the sleeve 160, and the annular seal ring 161 is arranged in the positioning recess.

Continued with reference to FIG. 1 and FIG. 2, the multi-hole ferrule 110 is a male ferrule, and the ferrule assembly 1000 further comprises an alignment pin 120 mating with a alignment hole in a female ferrule, the alignment pin 120 is fitted in a mounting hole of the multi-hole ferrule 110 and projecting from a front end of the multi-hole ferrule 110.

However, the present disclosure is not limited to the illustrated embodiments, the multi-hole ferrule may be a female ferrule, and an alignment hole is formed in the female ferrule to mate with an alignment pin 120 of a male ferrule 110.

Figure 6:
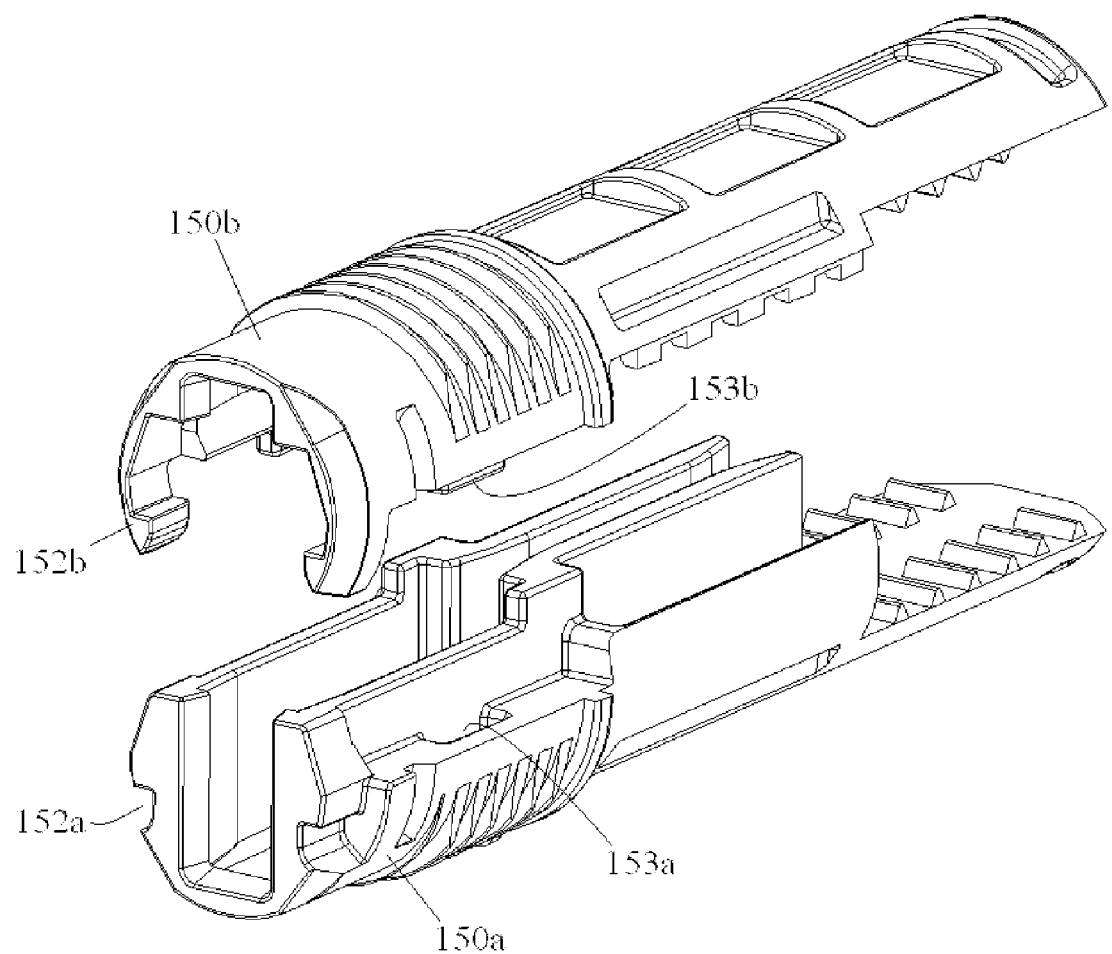
FIG. 6 is a schematic exploded view showing an inner housing of the ferrule assembly shown in FIG. 1.
Figure 7:
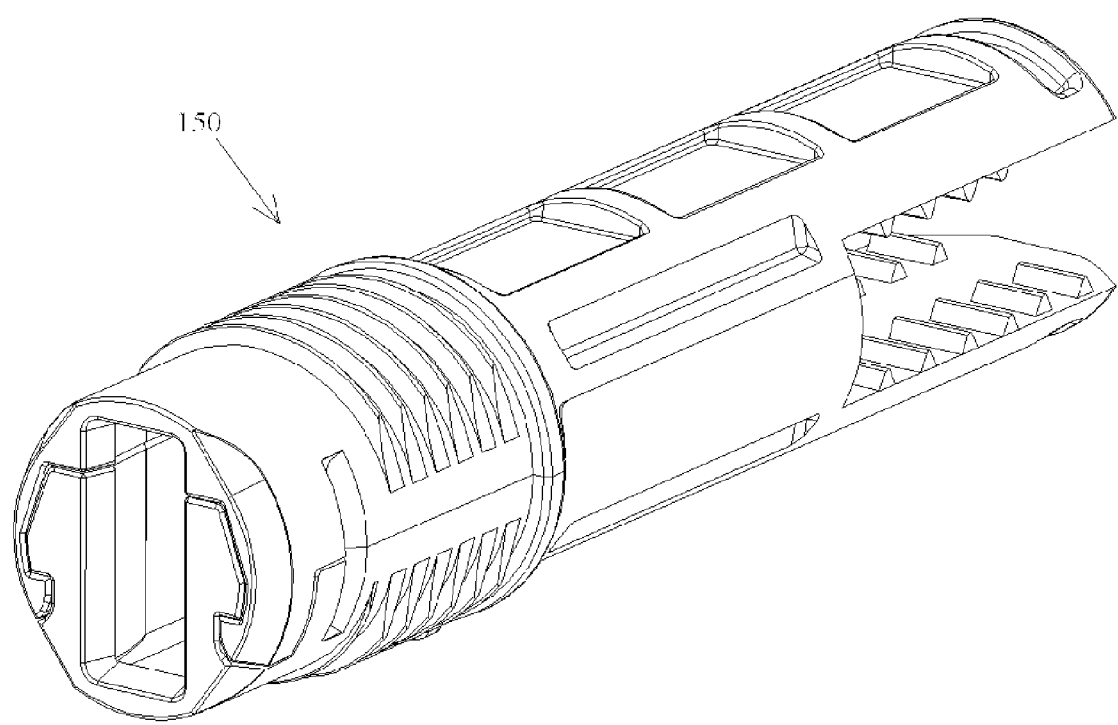
FIG. 7 is an assembly diagram showing the inner housing of the ferrule assembly shown in FIG. 1.

FIG. 6 is a schematic exploded view showing the inner housing of the ferrule assembly shown in FIG. 1; and FIG. 7 is an assembly diagram showing the inner housing of the ferrule assembly shown in FIG. 1.

As shown in FIGS. 1-2 and FIGS. 6-7, the inner housing 150 comprises a first half-housing 150a and a second half-housing 150b which are separated from each other and are capable of being assembled together.

As shown in FIGS. 6-7, the first half-housing 150a and the second half-housing 150b are assembled together through a first snapping mechanism. In the illustrated embodiment, the first snapping mechanism comprises: a first elastic snapping buckle 152b formed on one of the first half-housing 150a and the second half-housing 150b; and a first snapping recess 152a formed in the other one of the first half-housing 150a and the second half-housing 150b.

Continued with reference to FIGS. 6-7, two first positioning features, which cooperate with each other for preventing the first half-housing 150a and the second half-housing 150b from being assembled together in a misalignment state, are formed on the first half-housing 150a and the second half-housing 150b, respectively. In the illustrated embodiment, the first positioning features comprises: a first positioning protrusion 153b formed on one of the first half-housing 150a and the second half-housing 150b; and a first positioning recess 153a formed on the other one of the first half-housing 150a and the second half-housing 150b.

FIG. 14 is a schematic enlarged view showing the ferrule protection cap and the multi-hole ferrule shown in FIG. 1; and FIG. 15 is a schematic diagram showing an operation of assembling the ferrule protection cap and the multi-hole ferrule shown in FIG. 1.

As shown in FIGS. 1-2 and FIGS. 14-15, the ferrule protection cap 190 comprises: a block like body portion 191 including the mating end surface 195 mating with the front end surface 111 of the ferrule 110; and the elastic tail portion 192 connected to a side of the body portion 191 opposite to the mating end surface 195 and extending by a predetermined length in the direction of axis of the optical fibers.

As shown in FIGS. 14-15, a receiving recess 193 is formed in the mating end surface 195 of the ferrule protection cap 190, so that when the ferrule protection cap 190 is fitted over the front end surface 111 of the ferrule 110, the front end surfaces of the optical fibers 102, which protrude from the front end surface 111 of the ferrule 110, are hermetically received within the receiving recess 193.

In one embodiment of the present disclosure, as shown in FIGS. 14-15, the front end surface 111 of the ferrule 110 is formed at a predetermined angle to axes of the optical fibers, and the mating end surface 195 of the ferrule protection cap 190 is formed at an angle complementary to that of the front end surface 111 of the ferrule 110.

In the illustrated embodiment, the ferrule 110 is a male ferrule, and the mating end surface 195 of the ferrule protection cap 190 is formed therein with an assembling hole 194 for mating with the alignment pin 120 of the male ferrule. However, the present disclosure is not limited to the illustrated embodiments, and the ferrule may be a female ferrule. When the ferrule is a female ferrule, the mating end surface of the protection cap is formed thereon with a projecting assembling pin for mating with an alignment hole of the female ferrule.

As shown in FIGS. 14-15, the elastic tail portion 192 of the ferrule protection cap 190 is a corrugated elastic component. However, the present disclosure is not limited to this, the elastic tail portion 192 of the ferrule protection cap 190 may also be an elastic component in the form of a spring or an elastic component in the form of an elastic sheet.

Figure 3:
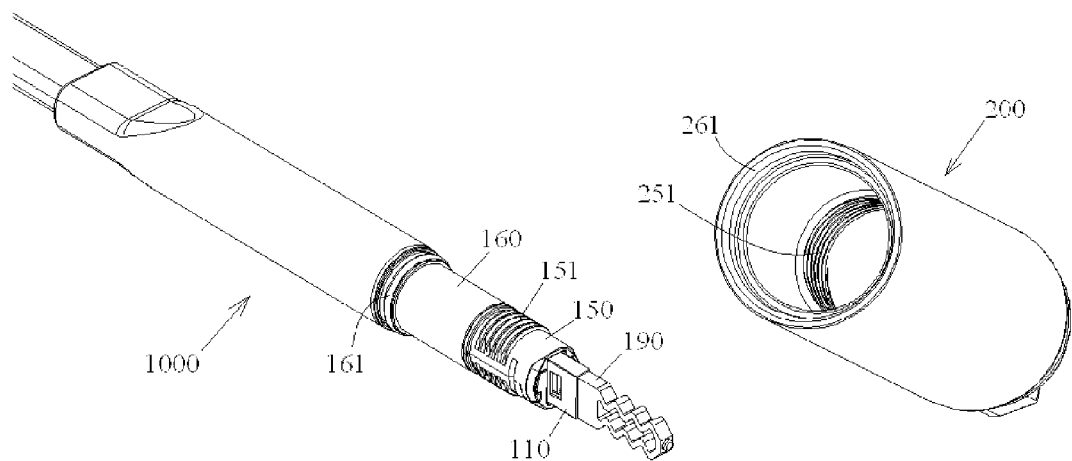
FIG. 3 is a schematic exploded view showing a traction assembly according to one exemplary embodiment of the present disclosure.
Figure 4:
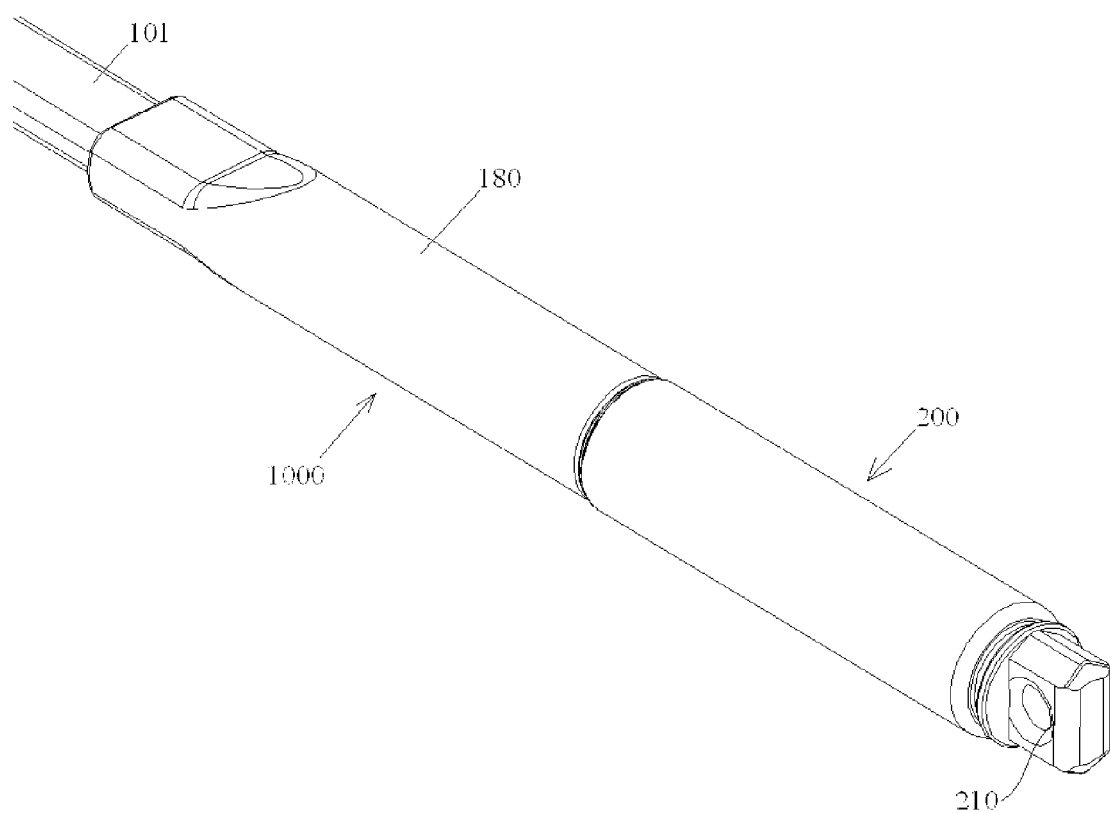
FIG. 4 is an assembly diagram showing a traction assembly according to one exemplary embodiment of the present disclosure.

FIG. 3 is a schematic exploded view showing a traction assembly according to one exemplary embodiment of the present disclosure; FIG. 4 is an assembly diagram showing a traction assembly according to one exemplary embodiment of the present disclosure; and FIG. 5 is a partially cross sectional view of the traction assembly shown in FIG. 4, showing the ferrule protection cap.

Figure 5:
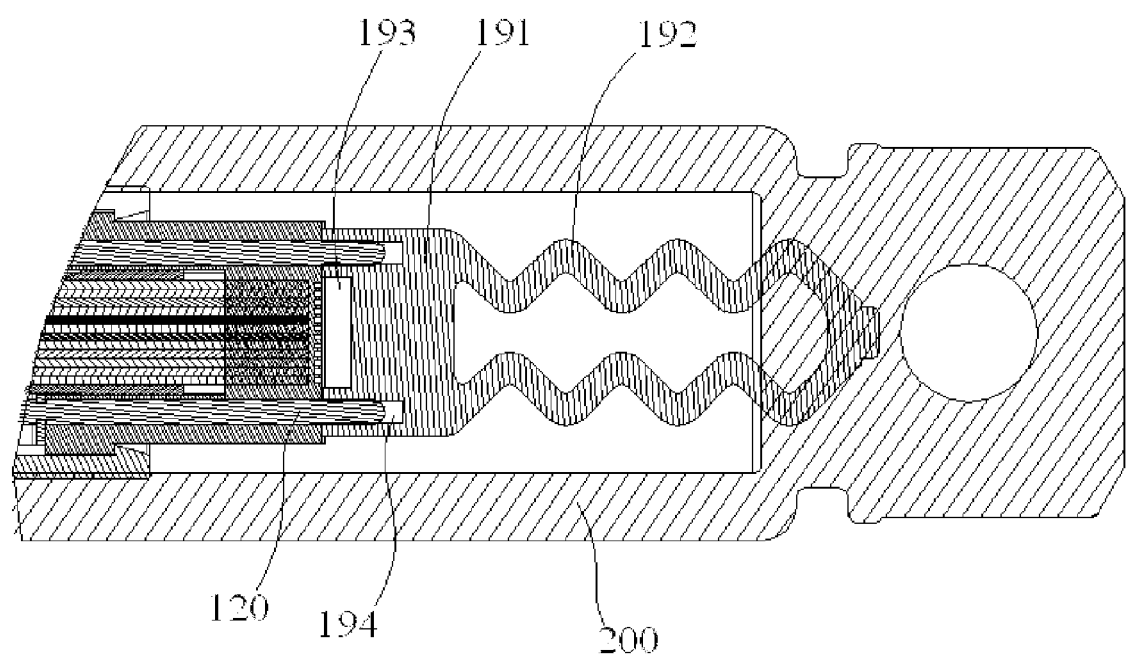
FIG. 5 is a partially cross sectional view of the traction assembly shown in FIG. 4, showing a ferrule protection cap.

As shown in FIG. 3 to FIG. 5, there is disclosed a traction assembly, comprising: a ferrule assembly 1000 according to any one of the above embodiments; and a traction component 200, which is hermetically connected to the ferrule assembly 1000, seals the ferrule 110 of the ferrule assembly 1000 therein, and is used to tow the ferrule assembly 1000 through a pipe.

In one embodiment of the present disclosure, when the traction component 200 is hermetically connected to the ferrule assembly 1000, the traction component 200 holds the ferrule protection cap 190 of the ferrule assembly 1000 on the ferrule 110 so as to prevent the ferrule protection cap 190 from being disengaged from the ferrule 110 when the ferrule assembly 1000 is towed through the pipe. As shown in FIG. 5, the elastic tail portion 192 of the ferrule protection cap 190 has a relative long length, and thus, when the traction component 200 is hermetically connected to the ferrule assembly 1000, an inner wall of the traction component 200 is pressed against the elastic tail portion 192 of the ferrule protection cap 190 so as to elastically hold the ferrule protection cap 190 over the ferrule 110.

In the illustrated embodiment, the traction component 200 is threaded on the inner housing 150 of the ferrule assembly 1000; and when the traction component 200 is threaded on the inner housing 150 of the ferrule assembly 1000, an annular seal ring 161 over the sleeve 160 of the ferrule assembly 1000 is pressed by the traction component 200 so as to seal an interface between the traction component 200 and the ferrule assembly 1000.

As shown in FIGS. 3-5, the traction component 200 is a cylindrical component having a closed end and an open end, and the cylindrical component is fitted over the inner housing 150 of the ferrule assembly 1000.

As shown in FIGS. 3-5, an external thread 151 is formed on an outer wall of the inner housing 150 of the ferrule assembly 1000, and an internal thread 251 is formed on an inner wall of the traction component 200 and configured to be connected with the external thread 151.

As shown in FIGS. 3-5, a connection portion 210 is formed on an outer side of the closed end of the traction component 200 and connected with a traction rod or a traction cord, so that the traction assembly 1000 is driven through the pipe by pulling or pushing the traction rod or the traction cord.

As shown in FIGS. 3-5, the inner wall of the traction component 200 is pressed against the elastic tail portion 192 of the ferrule protection cap 190, so that the ferrule protection cap 190 is elastically held over the ferrule 110.

As shown in FIGS. 3-5, the outer diameter of the traction component 200 is substantially the same as that of thermal shrinkable tube 180, thereby reducing the outer diameter dimension of the whole traction assembly as small as possible.

Figure 8:
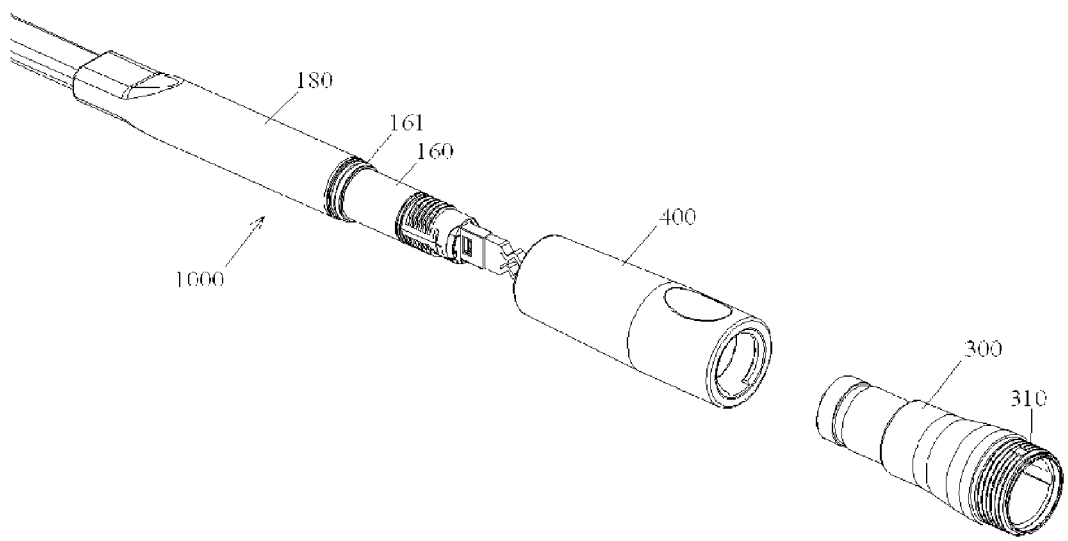
FIG. 8 is a schematic exploded view showing an optical fiber connector according to one exemplary embodiment of the present disclosure.
Figure 9:
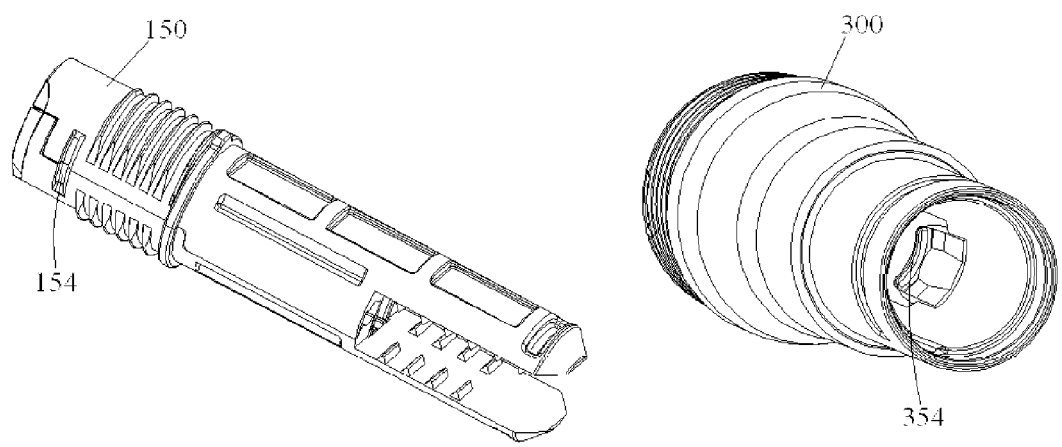
FIG. 9 is a schematic diagram showing a snapping mechanism between an outer housing and the inner housing of the optical fiber connector shown in FIG. 8.

FIG. 8 is a schematic exploded view showing an optical fiber connector according to one exemplary embodiment of the present disclosure; FIG. 9 is a schematic diagram showing a snapping mechanism between an outer housing and the inner housing of the optical fiber connector shown in FIG. 8; and FIG. 10 is a schematic diagram showing a state in which the ferrule protection cap of the ferrule assembly passes through a receiving hole of the outer housing of the optical fiber connector shown in FIG. 8.

Figure 10:
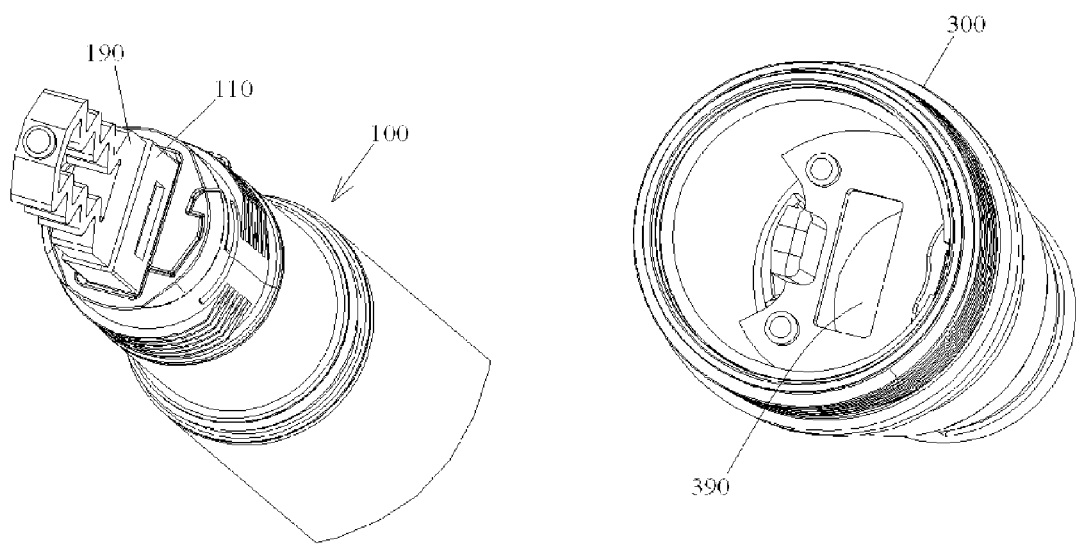
FIG. 10 is a schematic diagram showing a state in which the ferrule protection cap of the ferrule assembly shown in FIG. 8 is passed through a receiving hole of the outer housing of the optical fiber connector.

As shown in FIGS. 8-10, an annular seal ring 161 is fitted over the sleeve 160 so that when the outer housing 300 of the optical fiber connector is fitted on the ferrule assembly 1000, the annular seal ring 161 is pressed by the outer housing 300 of the optical fiber connector, thereby sealing an interface between the outer housing 300 of the optical fiber connector and the ferrule assembly 1000.

As shown in FIGS. 8-10, the inner housing 150 and the outer housing 300 are assembled together through a second snapping mechanism. In one embodiment, the second snapping mechanism comprises: a second elastic snapping buckle 354 formed on one of an outer wall of the inner housing 150 and an inner wall of the outer housing 300; and a second snapping recess 154 formed in the other one of the outer wall of the inner housing 150 and the inner wall of the outer housing 300.

As shown in FIGS. 8-10, two second positioning features, which cooperate with each other for preventing the inner housing 150 and the outer housing 300 from being assembled together in a misalignment state, are formed on the outer wall of the inner housing 150 and the inner wall of the outer housing 300, respectively. In one embodiment, the second positioning features comprise: a second positioning protrusion 155 formed on one of the outer wall of the inner housing 150 and the inner wall of the outer housing 300; and a second positioning recess 355 formed in the other one of the outer wall of the inner housing 150 and the inner wall of the outer housing 300.

Figure 11:
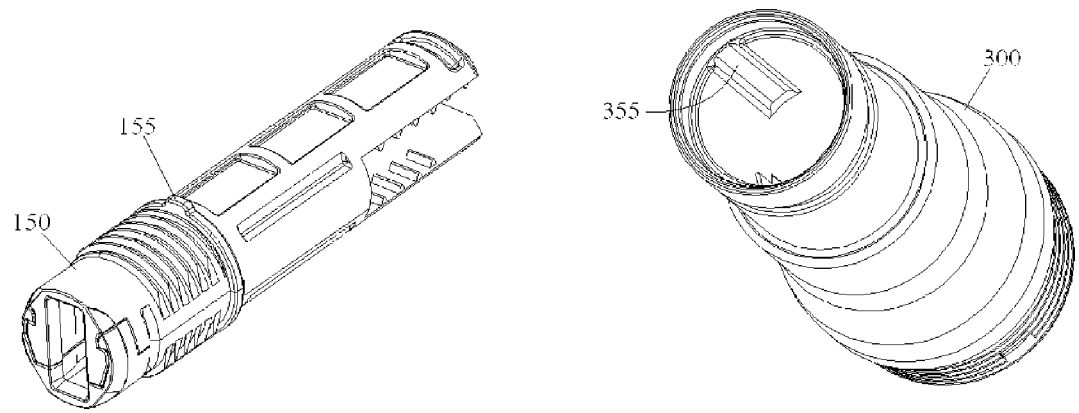
FIG. 11 is a schematic diagram showing a positioning structure for preventing an error mounting between an inner housing and an outer housing of a female connector.
Figure 12:
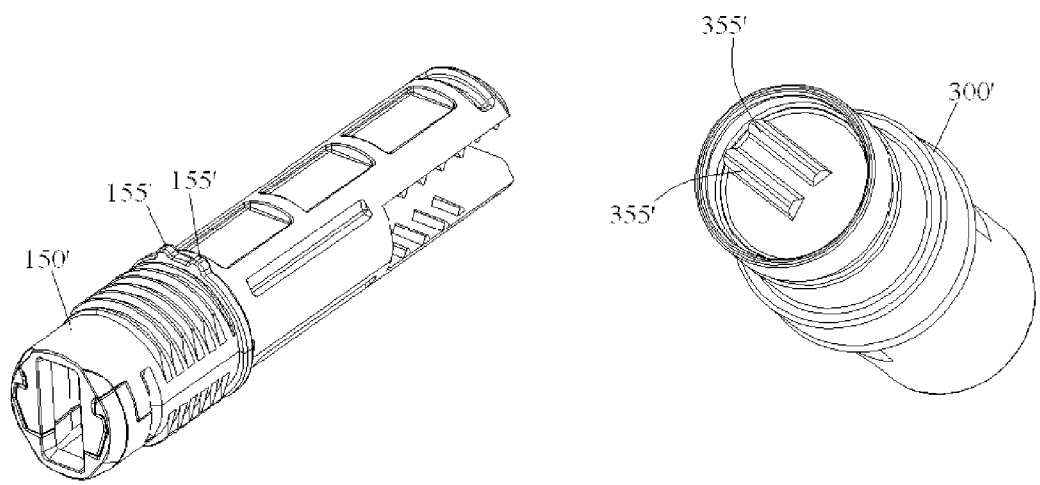
FIG. 12 is a schematic diagram showing a positioning structure for preventing an error mounting between an inner housing and an outer housing of a male connector.

FIG. 11 is a schematic diagram showing a positioning structure for preventing an error mounting between an inner housing and an outer housing of a female connector; and FIG. 12 is a schematic diagram showing a positioning structure for preventing an error mounting between an inner housing and an outer housing of a male connector.

The optical fiber connector may be a female connector shown in FIG. 11 or a male connector shown in FIG. 12, and the second positioning feature of the female connector mismatches with the second positioning feature of the male connector so as to prevent the outer housing 300' of the male connector from being mounted on the inner housing 150 of the female connector in error, or to prevent the outer housing 300 of the female connector from being mounted on inner housing 150' of the male connector in error.

As shown in FIG. 11 and FIG. 12, dimensions, number and shapes of the second positioning features of the female connector may be different from those of the second positioning features of the male connector. For example, the second positioning features of the female connector 300 shown in FIG. 11 comprise one positioning protrusion 155 and one positioning recess 355 mating with each other, while the second positioning features of the female connector 300' shown in FIG. 12 comprise two positioning protrusions 155' and two positioning recesses 355' mating with the two positioning protrusions. In addition, dimensions and shapes of the positioning protrusion 155 and the positioning recess 355 shown in FIG. 11 are different from those of the positioning protrusions 155' and positioning recesses 355' shown in FIG. 12.

Figure 13:
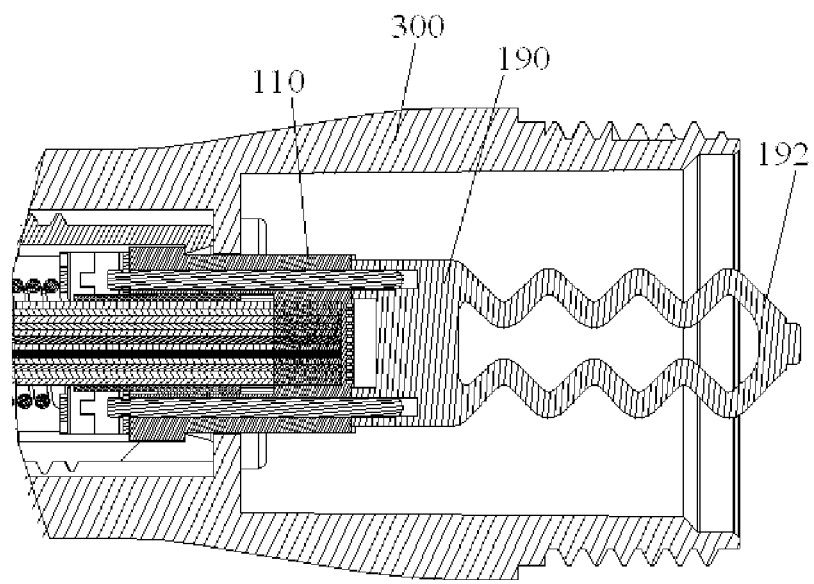
FIG. 13 is a partially cross sectional view of an assembled optical fiber connector according to one exemplary embodiment of the present disclosure, showing the ferrule protection cap.

FIG. 13 is a partially cross sectional view of an assembled optical fiber connector according to one exemplary embodiment of the present disclosure, showing the ferrule protection cap.

As shown in FIGS. 11-13, a receiving hole 390 for mating with the ferrule 110 is formed in the outer housing 300 of the optical fiber connector; and the ferrule protection cap 190 is configured to be capable of passing through the receiving hole 390 of the optical fiber connector. In one embodiment of the present disclosure, a dimension of the ferrule protection cap 190 in a direction perpendicular to the axes of the optical fibers is smaller than that of the ferrule 110 in the direction perpendicular to the axes of the optical fibers.

As shown in FIGS. 11-13, when the outer housing 300 of the optical fiber connector is fitted on the ferrule assembly 1000, the elastic tail portion 192 of the ferrule protection cap 190 extends out of the outer housing 300 so as to facilitate removal of the ferrule protection cap 190 after the outer housing 300 is fitted on ferrule assembly 1000. In the illustrated embodiment, the ferrule protection cap 190 is assembled onto the front end surface 111 of the ferrule 110 by a shaft-hole fitting. Thus, the ferrule protection cap 190 can be easily removed from the ferrule 110.

According to a further general inventive concept of the present invention, there is provided a method of assembling an optical fiber connector, comprising steps of:

providing a ferrule assembly 1000 according to any one of the embodiments described above; and fitting the outer tail tube 400 and the outer housing 300 on the ferrule assembly 1000.

According to a further general inventive concept of the present invention, there is provided a method of assembling an optical fiber connector on site, comprising steps of:

providing a traction assembly as described above;

towing the traction assembly through an elongated pipe;

removing the traction component 200 from the ferrule assembly 1000; and fitting the outer housing 300 and the outer tail tube 400 of the optical fiber connector on the ferrule assembly 1000, thereby forming an integrated optical fiber connector.

According to a further general inventive concept of the present invention, there is provided an optical fiber connector, comprising an integrated ferrule assembly 1000 formed by assembling a plurality of components together, and an integrated outer housing assembly 2000 formed by assembling a plurality of components together. The ferrule assembly 1000 is adapted to be fitted in housing assembly 2000. The integrated ferrule assembly 1000 at least comprises the following components: an inner housing 150; a spring 140 mounted in the inner housing 150; a multi-hole ferrule 110 mounted on a front end of the inner housing 150 and compressing the spring 140; a multi-fiber optical cable 101 with an end thereof inserted into the inner housing 150 from a rear end of the inner housing 150, a plurality of optical fibers 102 at the end being fixed in a plurality of through holes of the ferrule 110; a sleeve 160 mounted on the rear end of the inner housing 150 and cooperating with the inner housing 150 to fix a strengthening element 103 which is located at one end of the cable 101 on the rear end of the inner housing 150; and a thermal shrinkable tube 180 thermally shrunk over the sleeve 160 and a section of the cable 101 exposed from the sleeve 160. The integrated outer housing assembly 2000 at least comprises the following components: an outer housing 300; an outer tail tube 400 connected to a rear end of the outer housing 300; and an outer protection cap 500 hermetically connected to a front end of the outer housing 300.

Figure 16A:
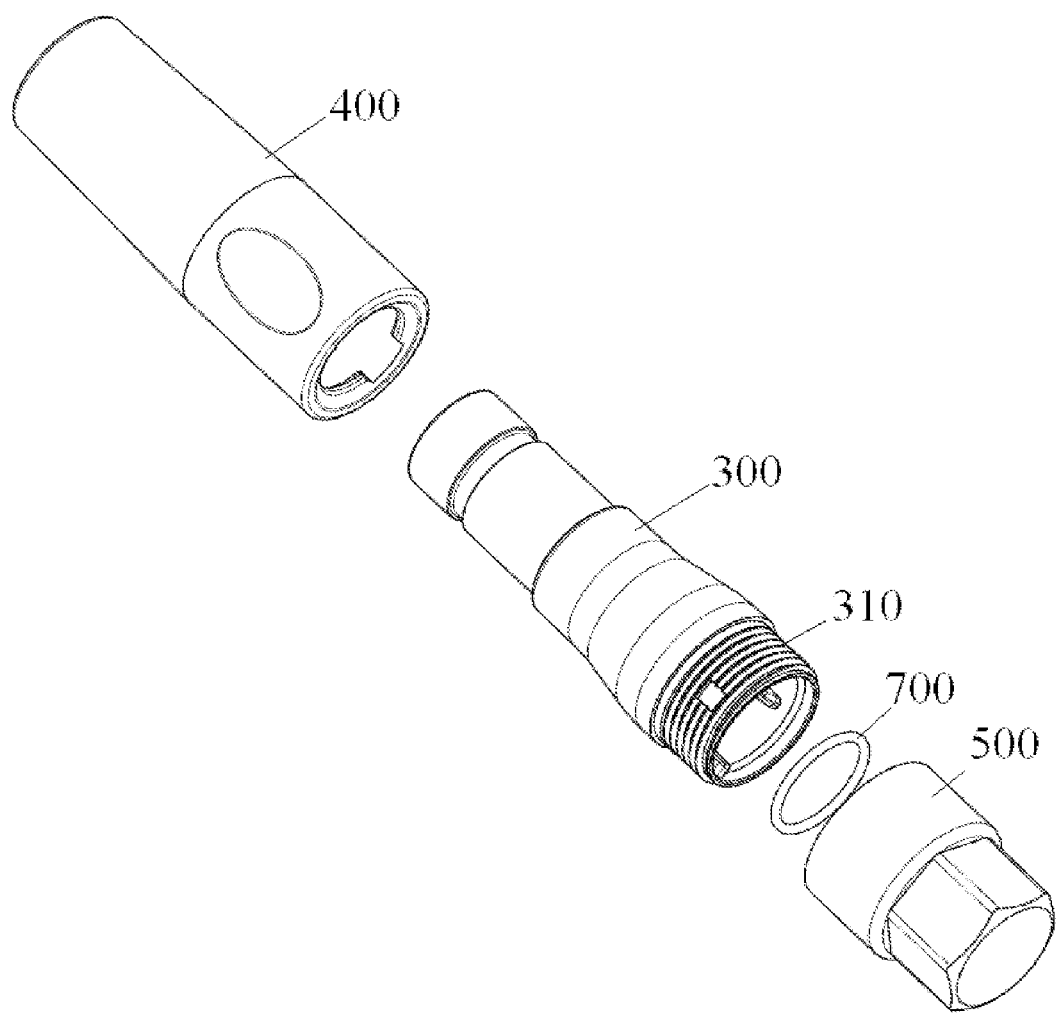
FIG. 16a is a schematic exploded view showing a housing assembly of a female connector.
Figure 16B:
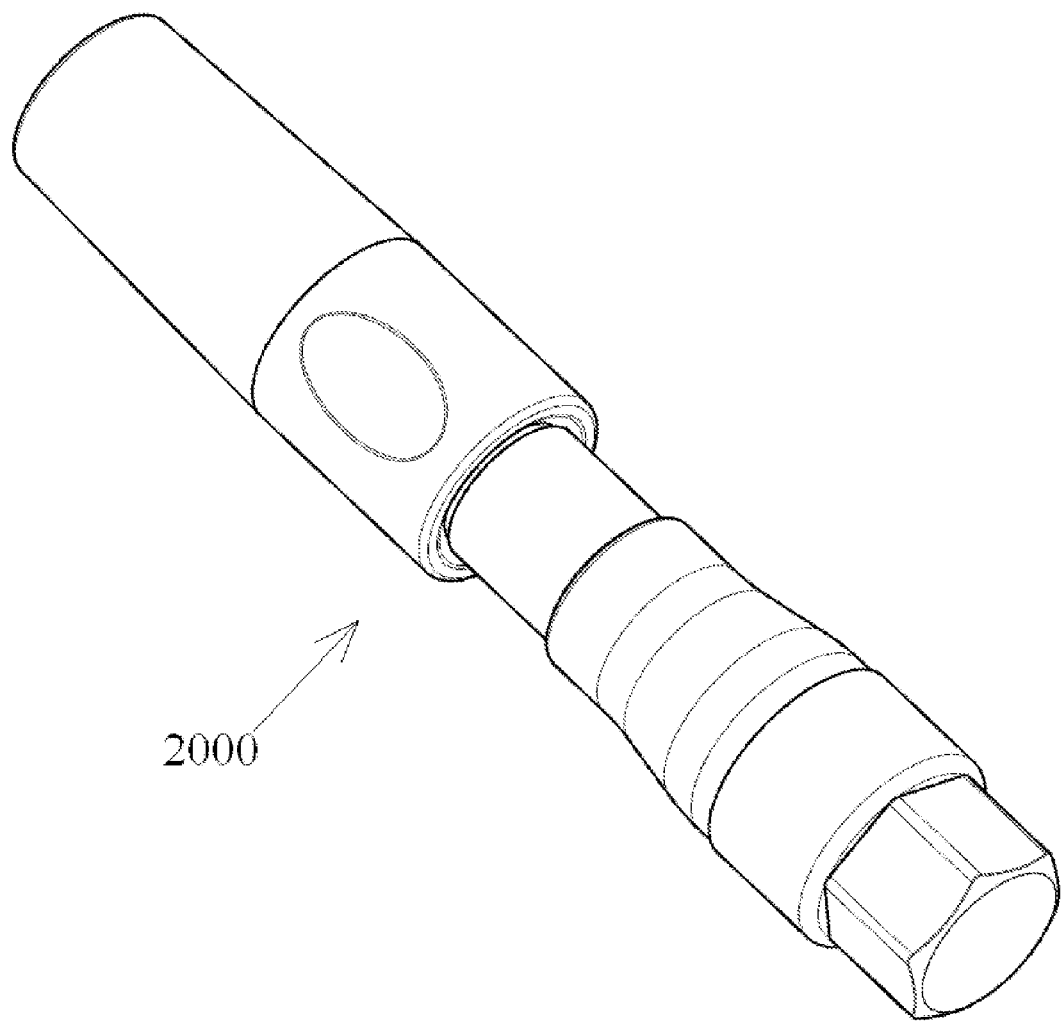
FIG. 16b is an assembly diagram showing the housing assembly of the female connector.
Figure 17A:
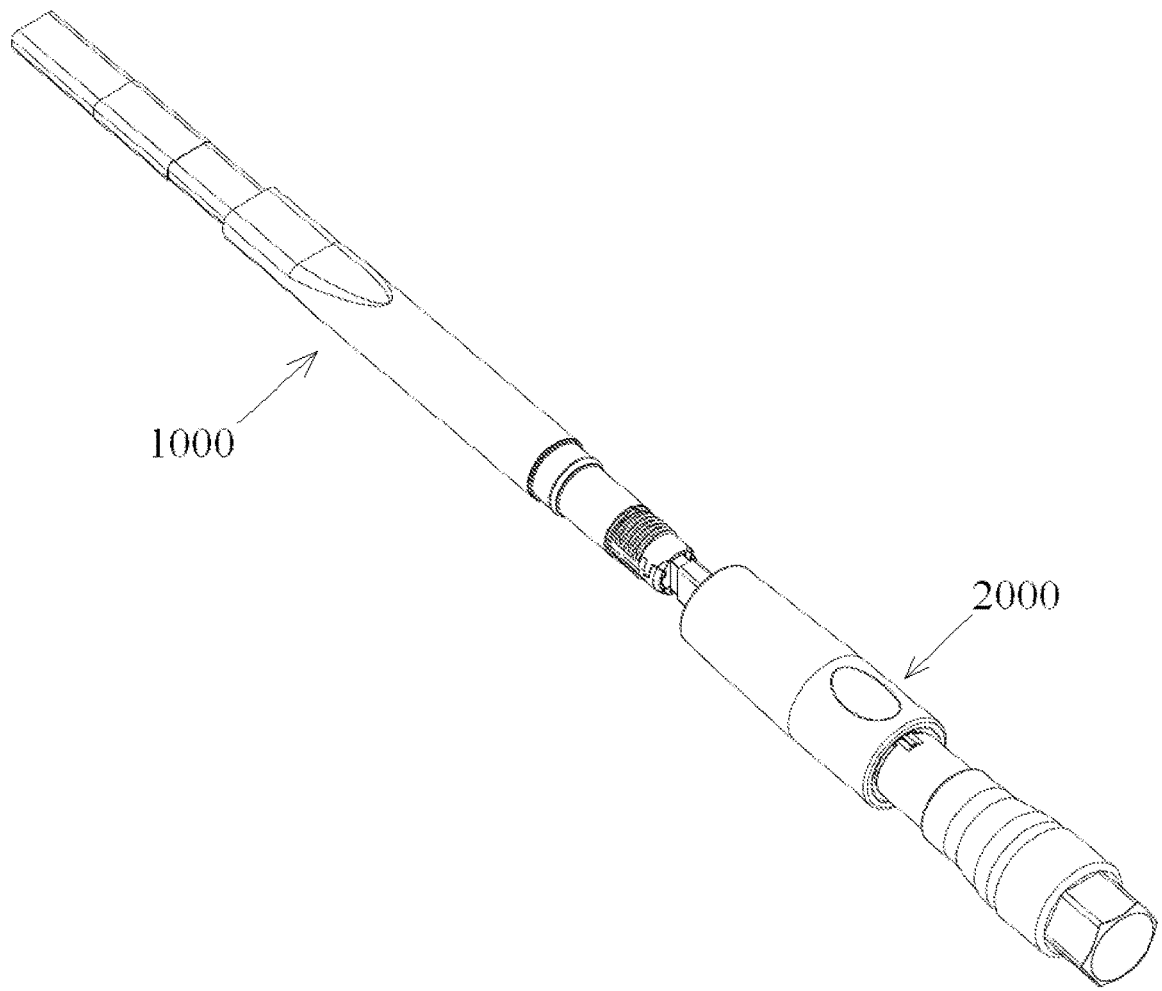
FIG. 17a is a schematic diagram showing the ferrule assembly and the housing assembly of the female connector.

FIG. 16a is a schematic exploded view showing a housing assembly 2000 of a female connector 10; FIG. 16b is an assembly diagram showing the housing assembly 2000 of the female connector 10; FIG. 17a is a schematic diagram showing the ferrule assembly 1000 and the housing assembly 2000 of the female connector 10; and FIG. 17b is an assembly diagram showing the female connector 10 formed by assembling the ferrule assembly 1000 and housing assembly 2000 shown in FIG. 17a.

As shown in FIG. 16a and FIG. 16b, in the illustrated embodiment, components such as the outer housing 300, the outer tail tube 400, the outer protection cap 500, a seal ring 700 and the like can be preassembled into an integrated outer housing assembly 2000.

In one embodiment of the present disclosure, the outer tail tube 400 is fitted over the rear end of the outer housing 300. An external thread 310 is formed on an outer wall of the frond end of the outer housing 300, and an internal thread (not shown) is formed on an inner wall of the outer protection cap 500. The outer protection cap 500 is threaded on the outer wall of the front end of the outer housing 300, and the seal ring 700 is pressed between the outer protection cap 500 and the outer housing 300, thereby sealing an interface between the outer protection cap 500 and the outer housing 300. As such, the outer protection cap 500 is hermetically connected to the front end of the outer housing 300.

Figure 17B:
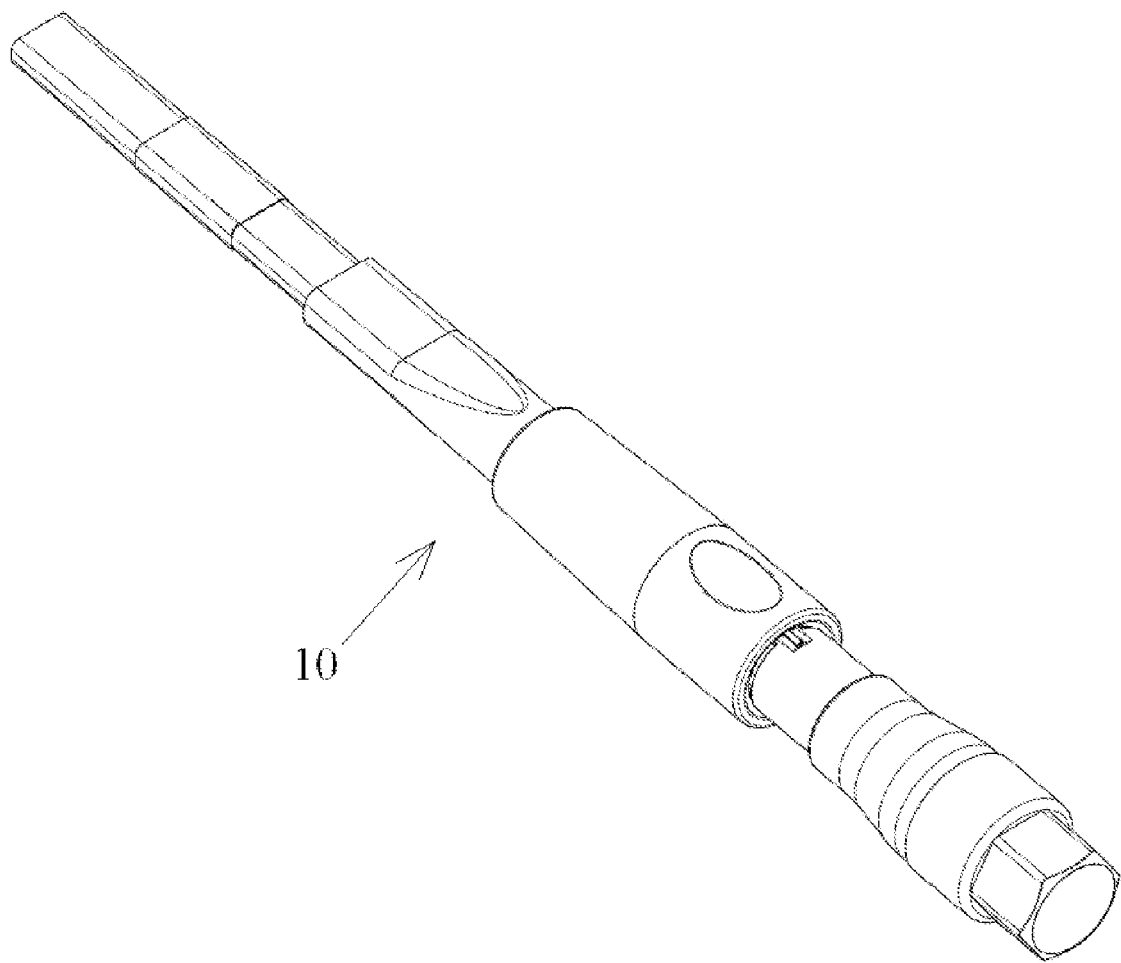

As shown in FIG. 17a and FIG. 17b, in the illustrated embodiment, since components such as the outer housing 300, the outer tail tube 400, the outer protection cap 500 and the like can be preassembled into an integrated outer housing assembly, a worker only needs to insert the integrated ferrule assembly 1000 into the integrated outer housing assembly 2000 on site, in such a way, the assembling operation of the whole optical fiber connector is completed conveniently without fitting the components, such as the outer housing 300, the outer tail tube 400, the outer protection cap 500 and the like, on the integrated ferrule assembly 1000 one by one on site, thereby improving assembling efficiency.

Figure 18A:
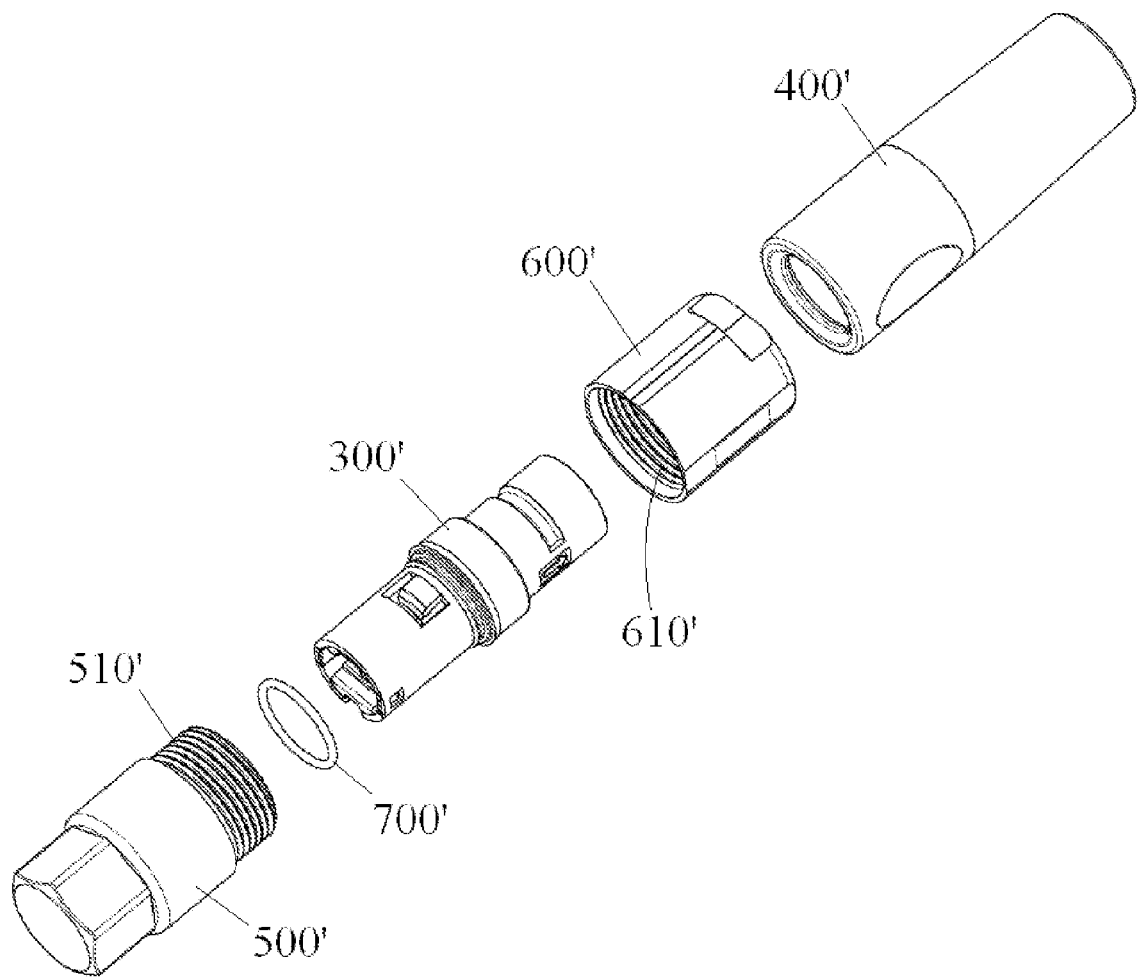
FIG. 18a is a schematic exploded view showing a housing assembly of a male connector.
Figure 18B:
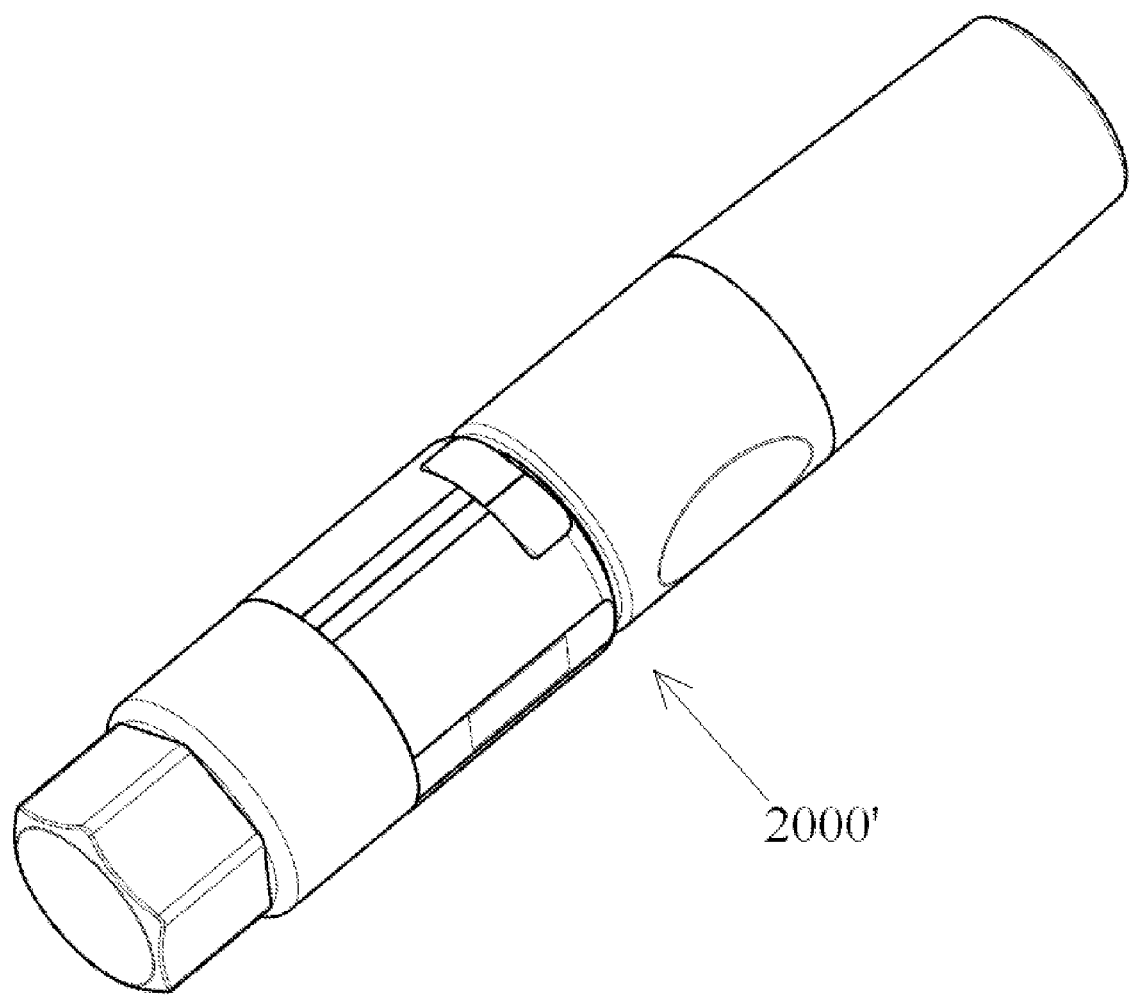
FIG. 18b is an assembly diagram showing the housing assembly of the male connector.
Figure 19A:
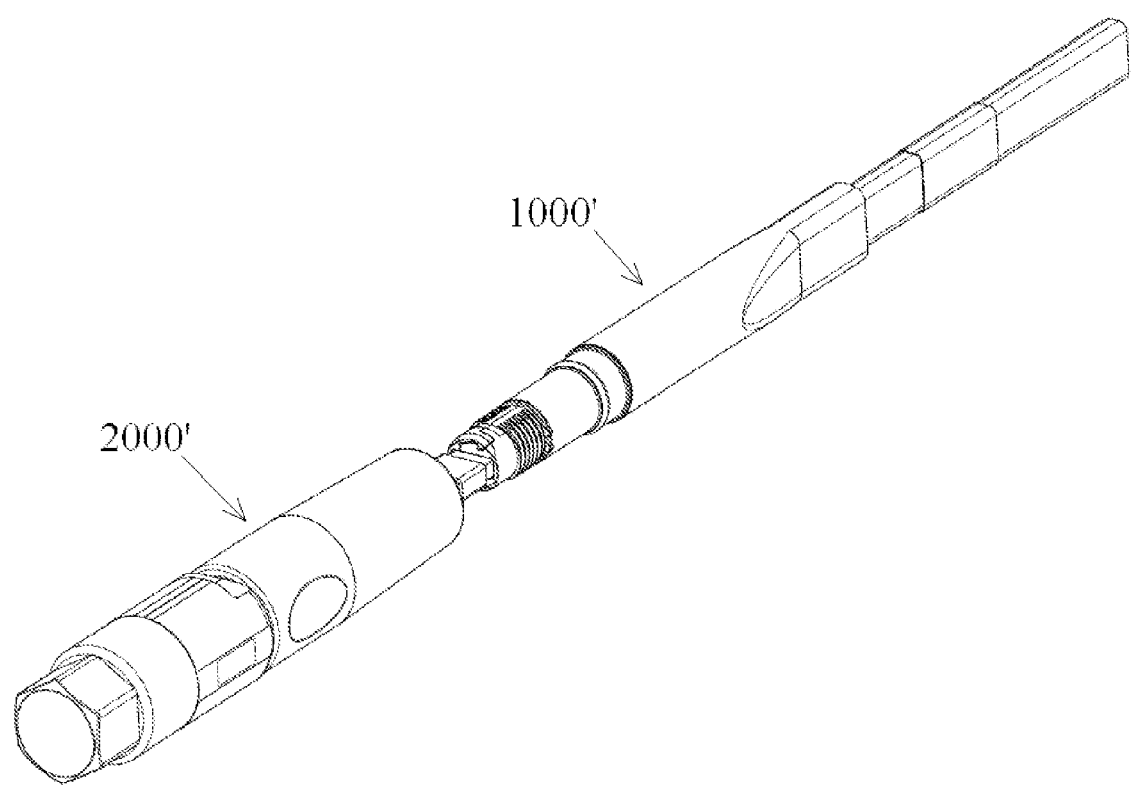
FIG. 19a is a schematic diagram showing the ferrule assembly and the housing assembly of the male connector.

FIG. 18a is a schematic exploded view showing a housing assembly 2000' of a male connector 10'; FIG. 18b is an assembly diagram showing the housing assembly 2000' of the male connector 10'; FIG. 19a is a schematic diagram showing the ferrule assembly 1000' and the housing assembly 2000' of the male connector 10'; and FIG. 19b is an assembly diagram showing the male connector 10' formed by assembling the ferrule assembly 1000' and housing assembly 2000' shown in FIG. 19a.

As shown in FIG. 18a and FIG. 18b, in the illustrated embodiment, components, such as an outer housing 300', an outer tail tube 400', an outer protection cap 500', a screw nut 600', a seal ring 700' and the like, are preassembled into an integrated outer housing assembly 2000'.

In one embodiment of the present disclosure, the outer tail tube 400' is fitted over a rear end of the outer housing 300'. The screw nut 600' is fitted over the outer housing 300'. An external thread 510' is formed on an outer wall of the frond end of the outer housing 300', and an internal thread 610' is formed on an inner wall of the screw nut 600'. The screw nut 600' and the outer protection cap 500' are threaded with each other, and the seal ring 700' is pressed between the outer protection cap 500' and the outer housing 300', thereby sealing an interface between the outer protection cap 500' and the outer housing 300'. In such a way, the outer protection cap 500' is hermetically connected to the front end of the outer housing 300'.

Figure 19B:
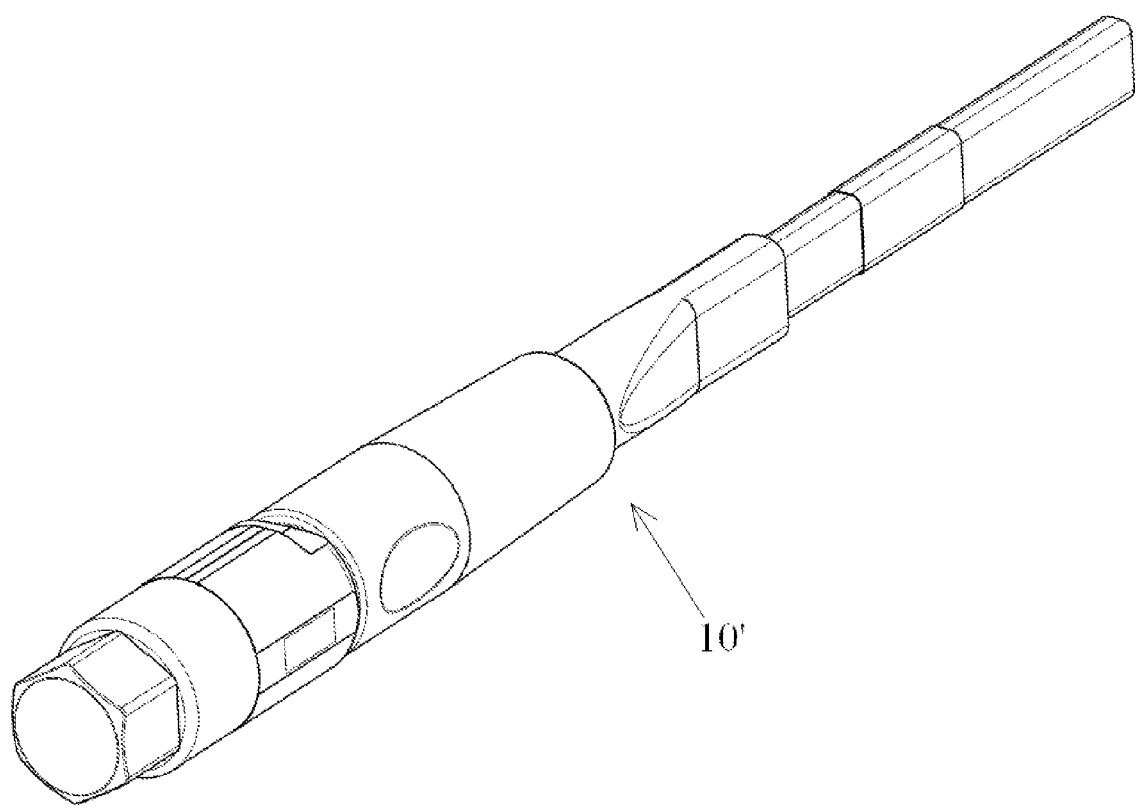

As shown in FIG. 19a and FIG. 19b, in the illustrated embodiment, since components such as the outer housing 300', the outer tail tube 400', the outer protection cap 500', the screw nut 600', the seal ring 700' and the like can be preassembled into an integrated outer housing assembly 2000', a worker only needs to insert the integrated ferrule assembly 1000' into the integrated outer housing assembly 2000' on site, in such a way, the assembling operation of the whole optical fiber connector is completed conveniently without fitting the components such as the outer housing 300', the outer tail tube 400', the outer protection cap 500', the screw nut 600', the seal ring 700' and the like on the integrated ferrule assembly 1000' one by one on site, thereby improving assembling efficiency.

According to a further general inventive concept of the present invention, there is provided a method of assembling an optical fiber connector on site, comprising steps of:

providing the ferrule assembly 1000 as shown in FIG. 2;

providing the traction component 200 and hermetically connecting the traction component 200 to the ferrule assembly 1000 so as to seal the ferrule 110 of the ferrule assembly 1000 within the traction component, as shown in FIG. 3 and FIG. 4;

passing the ferrule assembly 1000 through an elongated pipe by towing the traction component 200;

removing the traction component 200 from the ferrule assembly 1000;

providing the housing assembly 2000 as shown in FIG. 16; and fitting the ferrule assembly 1000 into the housing assembly 2000, thereby forming an integrated optical fiber connector 10, as shown in FIG. 17.

Although the present disclosure has been described in conjunction with the attached drawings, the embodiments shown in the drawings are intended to exemplarily illustrate preferred embodiments of the present invention, and should not be interpreted as being limitative to the present invention.

Although several exemplary embodiments of the general inventive concept have been shown and described, it would be appreciated by those skilled in the art that various changes or modifications may be made in these embodiments without departing from the principles and spirit of the present invention, the scope of which is defined in the claims and their equivalents.

It should be noted the term "comprise" does not exclude other elements or steps, and the term "a" or "an" does not exclude more than one component. Further, any reference number in claims should be interpreted as being limitative to the scope of the present invention.

What is claimed is:

1. An optical fiber connector, comprising:
   an integrated ferrule assembly composed of at least:
      an inner housing;
      a spring mounted in the inner housing;
      a multi-hole ferrule mounted on a front end of the inner housing and compressing the spring;
      a multi-fiber optical cable with an end thereof inserted into the inner housing from a rear end of the inner housing, a plurality of optical fibers at the end being fixed in a plurality of through holes of the ferrule;
      a sleeve mounted on the rear end of the inner housing and cooperating with the inner housing to fix a strengthening element which is located at one end of the cable on the rear end of the inner housing (150); and
      a thermal shrinkable tube thermally shrunk over the sleeve (160) and a section of the cable exposed from the sleeve; and
   an integrated outer housing assembly composed of at least:
      an outer housing;
      an outer tail tube connected to a rear end of the outer housing; and
      an outer protection cap hermetically connected to a front end of the outer housing,
   wherein the integrated ferrule assembly is adapted to be fitted in the integrated outer housing assembly.

2. The optical fiber connector according to claim 1, wherein
   the optical fiber connector is a female connector; and
   the housing assembly further comprises a seal ring, the outer protection cap is threaded onto an outer wall of the front end of the outer housing, and the seal ring is pressed between the outer protection cap and the outer housing, thereby sealing an interface between the outer protection cap and the outer housing.

3. The optical fiber connector according to claim 1, wherein
   the optical fiber connector is a male connector, and
   the housing assembly further comprises a screw nut fitted over the outer housing and threaded with the outer protection cap, and a seal ring pressed between the outer protection cap and the outer housing, thereby sealing an interface between the outer protection cap and the outer housing.

4. The optical fiber connector according to claim 1, wherein
   an annular seal ring is fitted over the sleeve so that when the outer housing of the optical fiber connector is fitted on the ferrule assembly, the annular seal ring is pressed by the outer housing of the optical fiber connector, thereby sealing an interface between the outer housing (300) of the optical fiber connector and the ferrule assembly.

5. The optical fiber connector according to claim 4, wherein
an annular positioning recess is formed in the sleeve, and the annular seal ring is arranged in the positioning recess;
wherein the ferrule assembly further comprises an inner tail sleeve fixed on the rear end of the inner housing, and an optical fiber protection sleeve, which is embedded in a mounting groove at a rear end of the multi-hole ferrule, and through which the plurality of optical fibers pass; and
wherein the thermal shrinkable tube is thermally shrunk over the inner tail sleeve, and cooperates with the inner tail sleeve to form a lateral pulling prevention device for preventing the optical cable being affected by a lateral pulling force.

6. The optical fiber connector according to claim 5, wherein the multi-hole ferrule is a male ferrule, and the ferrule assembly further comprises an alignment pin mating with an alignment hole in a female ferrule, the alignment pin being fitted in a mounting hole of the multi-hole ferrule and projecting from a front end of the multi-hole ferrule.

7. The optical fiber connector according to claim 5, wherein the multi-hole ferrule is a female ferrule, in which an alignment hole is formed to mate with an alignment pin of a male ferrule.

8. The optical fiber connector according to claim 1, wherein the inner housing comprises a first half-housing and a second half-housing which are separated from each other and are capable of being assembled together.

9. The optical fiber connector according to claim 8, wherein the first half-housing and the second half-housing are assembled together through a first snapping mechanism;
wherein the first snapping mechanism comprises:
a first elastic snapping buckle formed on one of the first half-housing and the second half-housing; and
a first snapping recess formed in the other one of the first half-housing and the second half-housing;
wherein two first positioning features, which cooperate with each other for preventing the first half-housing and the second half-housing from being assembled together in a misalignment state, are formed on the first half-housing and the second half-housing, respectively;
wherein the first positioning features comprise:
a first positioning protrusion formed on one of the first half-housing and the second half-housing; and
a first positioning recess formed on the other one of the first half-housing and the second half-housing;
wherein the inner housing and the outer housing are assembled together through a second snapping mechanism; and
wherein the second snapping mechanism comprises:
a second elastic snapping buckle formed on one of an outer wall of the inner housing and an inner wall of the outer housing; and
a second snapping recess formed in the other one of the outer wall of the inner housing and the inner wall of the outer housing.

10. The optical fiber connector according to claim 9, wherein two second positioning features, which cooperate with each other for preventing the inner housing and the outer housing from being assembled together in a misalignment state, are formed on the outer wall of the inner housing and the inner wall of the outer housing, respectively;
wherein the second positioning features comprise:
a second positioning protrusion formed on one of the outer wall of the inner housing and the inner wall of the outer housing; and
a second positioning recess formed in the other one of the outer wall of the inner housing and the inner wall of the outer housing; and
wherein the optical fiber connector is a female connector or a male connector, and the second positioning feature of the female connector mismatches with the second positioning feature of the male connector so as to prevent the outer housing of the male connector from being mounted on the inner housing of the female connector in error, or to prevent the outer housing of the female connector from being mounted on inner housing of the male connector in error.

11. The optical fiber connector according to claim 10, wherein the ferrule assembly further comprises:
a ferrule protection cap fitted over a front end surface of the ferrule so as to cover front end surfaces of the optical fibers in an internal bore of the ferrule and at least a part of a mating region of the front end surface of the ferrule mating with a mating ferrule, so that the front end surfaces of the optical fibers and the at least a part of the mating region of the front end surface of the ferrule are isolated from external environment.

12. The optical fiber connector according to claim 11, wherein the ferrule protection cap comprises:
a body portion including a mating end surface mating with the front end surface of the ferrule; and
an elastic tail portion connected to a side of the body portion facing to the mating end surface and extending by a predetermined length in a direction of an axis of the optical fibers;
wherein a receiving recess is formed in the mating end surface of the ferrule protection cap, and the front end surfaces of the optical fibers are hermetically received within the receiving recess when the ferrule protection cap is fitted over the front end surface of the ferrule.

13. The optical fiber connector according to claim 12, wherein
the front end surface of the ferrule is formed at a predetermined angle with respect to axes of the optical fibers, and
the mating end surface of the ferrule protection cap is formed at an angle complementary to that of the front end surface of the ferrule.

14. The optical fiber connector according to claim 12, wherein
the elastic tail portion of the ferrule protection cap is a corrugated elastic component, an elastic component in the form of a spring, or an elastic component in the form of an elastic sheet.

15. A method of assembling an optical fiber connector on site, comprising steps of:
providing a ferrule assembly, the ferrule assembly comprising:
an inner housing;
a spring mounted in the inner housing;
a multi-hole ferrule mounted on a front end of the inner housing and compressing the spring;
a multi-fiber optical cable with an end thereof inserted into the inner housing from a rear end of the inner housing, a plurality of optical fibers at the end being fixed in a plurality of through holes of the ferrule;
a sleeve mounted on the rear end of the inner housing and cooperating with the inner housing to fix a strengthening element which is located at one end of the cable on the rear end of the inner housing; and a thermal shrinkable tube thermally shrunk over the sleeve and a section of the cable exposed from the sleeve;

providing a traction component and hermetically connecting the traction component to the ferrule assembly, so as to seal the ferrule of the ferrule assembly within the traction component;

passing the ferrule assembly through an elongated pipe by towing the traction component;

removing the traction component from the ferrule assembly;

providing an integrated housing assembly, the housing assembly comprising an outer housing, an outer tail tube connected to a rear end of the outer housing, and an outer protection cap hermetically connected to a front end of the outer housing; and fitting the ferrule assembly into the housing assembly, thereby forming an integrated optical fiber connector.

16. The method according to claim 15, wherein the ferrule assembly comprises a ferrule protection cap fitting over a front end surface of the ferrule; and when the traction component is hermetically connected to the ferrule assembly, the traction component holds the ferrule protection cap of the ferrule assembly on the ferrule so as to prevent the ferrule protection cap from being disengaged from the ferrule when the ferrule assembly is towed through the pipe.

17. The method according to claim 15, wherein the traction component is threaded on the inner housing of the ferrule assembly; and when the traction component is threaded on the inner housing of the ferrule assembly, an annular seal ring over the sleeve of the ferrule assembly is pressed by the traction component so as to seal an interface between the traction component and the ferrule assembly;

wherein the traction component is a cylindrical component having a closed end and an open end, the cylindrical component fitting over the inner housing of the ferrule assembly; and wherein an external thread is formed on an outer wall of the inner housing of the ferrule assembly, and an internal thread is formed on an inner wall of the traction component and configured to be connected with the external thread.

18. The method according to claim 17, wherein a connection portion is formed on an outer side of the closed end of the traction component and connected with a traction rod or a traction cord, so that the traction assembly is driven through the pipe by pulling or pushing the traction rod or the traction cord.

19. The method according to claim 16, wherein an inner wall of the traction component is pressed on an elastic tail portion of the ferrule protection cap, so that the ferrule protection cap is elastically held on the ferrule.

20. The method according to claim 18, wherein an outer diameter of the traction component is substantially the same as that of the thermal shrinkable tube.

21. An optical fiber connector, comprising:

an integrated ferrule assembly composed of at least:
an inner housing;
a spring mounted in the inner housing;
a multi-hole ferrule mounted on a front end of the inner housing and compressing the spring; and
a multi-fiber optical cable with an end thereof inserted into the inner housing from a rear end of the inner housing, a plurality of optical fibers at the end being fixed in a plurality of through holes of the ferrule; and an integrated outer housing assembly composed of at least:
an outer housing;
an outer tail tube connected to a rear end of the outer housing; and
an outer protection cap hermetically connected to a front end of the outer housing, wherein the integrated ferrule assembly is adapted to be fitted in the integrated outer housing assembly.

* * * * *

UNITED STATES PATENT AND TRADEMARK OFFICE
CERTIFICATE OF CORRECTION

PATENT NO. : 10,073,224 B2
APPLICATION NO. : 15/324971
DATED : September 11, 2018
INVENTOR(S) : Tong et al.

It is certified that error appears in the above-identified patent and that said Letters Patent is hereby corrected as shown below:

In the Claims

Column 16, Line 30, Claim 1: "inner housing (150);" should read --inner housing;--

Column 16, Line 33, Claim 1: "sleeve (160) and a section" should read --sleeve and a section--

Column 17, Lines 1-2, Claim 4: "housing (300) of the optical fiber" should read --housing of the optical fiber--

Signed and Sealed this
Seventeenth Day of March, 2020

Andrei Iancu
*Director of the United States Patent and Trademark Office*